(12) United States Patent
Furuya et al.

(10) Patent No.: US 8,807,240 B2
(45) Date of Patent: Aug. 19, 2014

(54) GAS-ENGINE-POWERED HANDHELD WORKING MACHINE

(75) Inventors: Kentaro Furuya, Wako (JP); Koichi Azuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 629 days.

(21) Appl. No.: 13/074,851

(22) Filed: Mar. 29, 2011

(65) Prior Publication Data

US 2011/0232931 A1 Sep. 29, 2011

(30) Foreign Application Priority Data

Mar. 29, 2010 (JP) ................................. 2010-075873

(51) Int. Cl.
*B25D 16/00* (2006.01)

(52) U.S. Cl.
USPC ............................................. 173/213; 227/10

(58) Field of Classification Search
USPC ............ 227/10; 123/465 SC, 46 SC; 173/213
See application file for complete search history.

(56) References Cited

U.S. PATENT DOCUMENTS

| | | | | |
|---|---|---|---|---|
| 4,286,675 A * | 9/1981 | Tuggle | | 173/213 |
| 4,717,060 A * | 1/1988 | Cotta | | 227/10 |
| 7,654,429 B2 * | 2/2010 | Shea et al. | | 227/10 |
| 7,841,499 B2 * | 11/2010 | Ho | | 227/10 |
| 7,841,500 B2 * | 11/2010 | Ho | | 227/10 |
| 2003/0127488 A1 * | 7/2003 | Wagdy | | 227/9 |
| 2007/0251967 A1 * | 11/2007 | Taylor et al. | | 227/10 |
| 2008/0000451 A1 * | 1/2008 | Shea et al. | | 123/46 SC |
| 2008/0110953 A1 * | 5/2008 | Gibson et al. | | 227/10 |
| 2009/0001120 A1 * | 1/2009 | Shea et al. | | 227/10 |

FOREIGN PATENT DOCUMENTS

| | | |
|---|---|---|
| JP | 3-116751 U | 12/1991 |
| JP | 2009-154588 | 7/2009 |

OTHER PUBLICATIONS

Office Action issued in corresponding Japanese Application P2010-075873 dated Nov. 8, 2013, with partial English translation.

* cited by examiner

*Primary Examiner* — Stephen F Gerrity
*Assistant Examiner* — Eyamindae Jallow
(74) *Attorney, Agent, or Firm* — Arent Fox LLP

(57) ABSTRACT

A gas-engine-powered handheld working machine has a working unit driven by a engine capable of running on a gas fuel supplied from a gas cartridge. The gas cartridge is arranged such that when the handheld working machine is disposed in a normal rest position where the handheld working machine is placed on a horizontal plane with a bottom surface of a machine body lying flat on the horizontal plane, the gas cartridge is disposed in a substantially vertical position with a discharge nozzle directed downwards while a central axis of the gas cartridge extends substantially perpendicular to the horizontal plane.

6 Claims, 18 Drawing Sheets

GAS-ENGINE-POWERED HANDHELD WORKING MACHINE

FIELD OF THE INVENTION

The present invention relates to a handheld working machine having a working unit driven by a gas engine capable of running on a gas fuel supplied from a gas cartridge.

BACKGROUND OF THE INVENTION

Handheld working machines of the type concerned include brush cutters equipped with a power source formed of a gas engine. A typical example of such gas-engine-powered brush cutters is disclosed in Japanese Utility Model Application Laid-open Publication (JP-U-A) No. 03-116,751. The disclosed brush cutter includes a cartridge case associated with the gas engine and configured to hold a gas cartridge in a substantially horizontal position. In operation, a liquefied gas fuel held in the gas cartridge is supplied from a discharge nozzle of the gas cartridge to the engine for driving the engine, and the engine rotatably drives a cutting blade as a working unit to thereby perform a desired brush-cutting operation.

In the brush cutter shown in JP-U 03-116,751, the gas cartridge is disposed in a horizontal position with the discharge nozzle directed toward the cutting blade. With this arrangement, when the brush cutter is used as an unwanted grass and plants cutter, the cutting blade is disposed at a position lower than a position of the engine and, hence, the gas cartridge is disposed in a first inclined position where the discharge nozzle is directed obliquely downward. During the unwanted grass and plants cutting operation, the liquefied gas fuel held in the cartridge is supplied in the liquid phase to the engine.

Alternatively, when the brush cutter is used as a tree-branch cutter, the cutting blade is disposed at a higher position than the engine and, hence, the gas cartridge is disposed in a second inclined position where the discharge nozzle is directed obliquely upward. During the tree-branch cutting operation, the liquefied gas fuel is supplied in the gas phase to the engine. The liquefied gas fuel, as it flows out from the gas cartridge in the gas phase, allows the corresponding amount of liquefied gas to become vaporized within the gas cartridge, which will take away a great amount of heat from the gas cartridge due to latent heat of vaporization. The gas cartridge is, therefore, likely to be cooled excessively with the result that vaporization of the liquefied gas fuel is made insufficient to secure smooth feed of fuel gas to the engine even when a certain amount of liquefied gas fuel still remains inside the gas cartridge.

With the foregoing drawbacks of the prior art in view, an object of the present invention is to provide a gas-engine-powered handheld working machine having structural features enabling that a liquefied gas fuel held in a gas cartridge can be supplied in the liquid phase from a discharge nozzle of the gas cartridge to an engine with the utmost efficiency regardless of variations in the posture of the handheld working machine during use.

SUMMARY OF THE INVENTION

According to a first aspect of the present invention, there is provided a gas-engine-powered handheld working machine, comprising: a cylindrical gas cartridge holding therein a liquefied gas fuel and having a discharge nozzle for supplying therefrom the gas fuel, the gas cartridge having a central axis passing through the discharge nozzle; a machine body including an engine capable of running on the gas fuel supplied from the discharge nozzle of the gas cartridge, the machine body having a bottom surface; and a working unit driven by the engine, wherein when the handheld working machine is disposed in a normal rest position in which the handheld working machine is placed on a horizontal plane with the bottom surface of the machine body lying flat on the horizontal plane, the gas cartridge is disposed in a substantially vertical position with the discharge nozzle directed downwards while the central axis of the gas cartridge extends substantially perpendicular to the horizontal plane.

With this arrangement, the discharge nozzle of the gas cartridge can maintain its downwardly directed position even when the gas cartridge is tilted forward or backward depending on the way of use of the gas-engine-powered handheld working machine. Thus, the gas fuel held in the gas cartridge can be supplied in the liquid phase from the discharge nozzle to the engine with high efficiencies.

In one preferred form of the invention, the engine includes an engine case, and the machine body includes a cartridge holding unit for holding therein the gas cartridge, the cartridge holding unit being formed integrally with the engine case.

Preferably, the cartridge holding unit includes a cartridge rotation mechanism for rotating the gas cartridge about the central axis thereof while the gas cartridge is held in the cartridge holding unit. This arrangement is particularly advantageous when the gas cartridge is held in an inclined position during use of the handheld working machine. As the gas cartridge turns about its central axis, an L-shaped fuel discharge pipe having the discharge nozzle at an outer end thereof and a fuel inlet at an inner end thereof is displaced from a first position in which the fuel inlet faces in an oblique upward direction, to a second position in which the fuel inlet faces in an oblique downward direction. When disposed at the second position, the fuel discharge pipe is still able to introduce the gas fuel from the fuel inlet until a liquid level of the gas fuel drops to a level located immediately below the fuel inlet. By thus turning the gas cartridge about its central axis, it is possible to use the gas fuel in the gas cartridge with the utmost efficiency particularly when the gas cartridge is tilted forward or backward depending on the way of use of the handheld working machine.

Preferably, the cartridge holding unit includes a cartridge case formed integrally with the engine case for receiving therein the gas cartridge, and a cartridge cover for covering the gas cartridge while the gas cartridge is received in the cartridge case, the cartridge cover being pivotally connected to the cartridge case and movable to undergo pivotal movement between an open position in which the cartridge case is opened, and a closed position in which the cartridge case is closed. The cartridge rotation mechanism includes an operation lever manually operable to rotate the gas cartridge about the central axis thereof, the operation lever projecting outwardly from the cartridge cover when the cartridge cover is disposed in the closed position. The cartridge cover is configured such that the cartridge cover can be opened and closed when the operation lever is disposed in a predetermined position where an amount of gas fuel left unused in the liquid phase within the gas cartridge can be minimized. With this arrangement, it is possible to reduce the number of operations of the operation lever by the human operator, and this will improve the usability of the handheld working machine.

Preferably, the cartridge holding unit includes a gas fuel flow passage through which the gas fuel from the discharge nozzle of the gas cartridge is supplied to the engine, an on-off changeover valve disposed across the gas fuel flow passage for opening and closing the gas fuel flow passage, and a selector knob manually operable to switch the on-off state of the on-off changeover valve, wherein the selector knob is configured to allow the cartridge cover to be opened when the selector knob is disposed in a valve closing position in which the on-off changeover valve is switched to the off state. By virtue of the selector knob, it is possible to keep the cartridge cover in the closed position as long as the on-off changeover valve is in the on state.

The gas cartridge is receivable in the cartridge case by being displaced in a horizontal direction while keeping the vertical position, wherein the cartridge holding unit includes: a nozzle retainer for retaining therein the discharge nozzle of the gas cartridge; a first guide groove and a second guide groove that extend along the horizontal direction for guiding the discharge nozzle into a standby position while guiding the discharge nozzle and a connection flange, respectively, of the gas cartridge when the gas cartridge is displaced in the horizontal direction, wherein when the gas cartridge is disposed in the standby position, the discharge nozzle of the gas cartridge is aligned with and disposed directly above the nozzle retainer; and presser means on the cartridge cover for forcing the gas cartridge in a downward direction to move the gas cartridge from the standby position to a loading position where the discharge nozzle of the gas cartridge is retained in the nozzle retainer. The foregoing way of loading the gas cartridge is advantageous over a conventional way of loading in which the discharge nozzle is likely to be damaged due to a bending force applied when the discharge nozzle is inserted into a nozzle retainer from an oblique direction while keeping the gas cartridge in an inclined position.

BRIEF DESCRIPTION OF THE DRAWINGS

A preferred embodiment of the present invention will be described in detail below, by way of example only, with reference to the accompanying sheets of drawings, in which.

DETAILED DESCRIPTION OF THE PREFERRED EMBODIMENT

Figure 1:
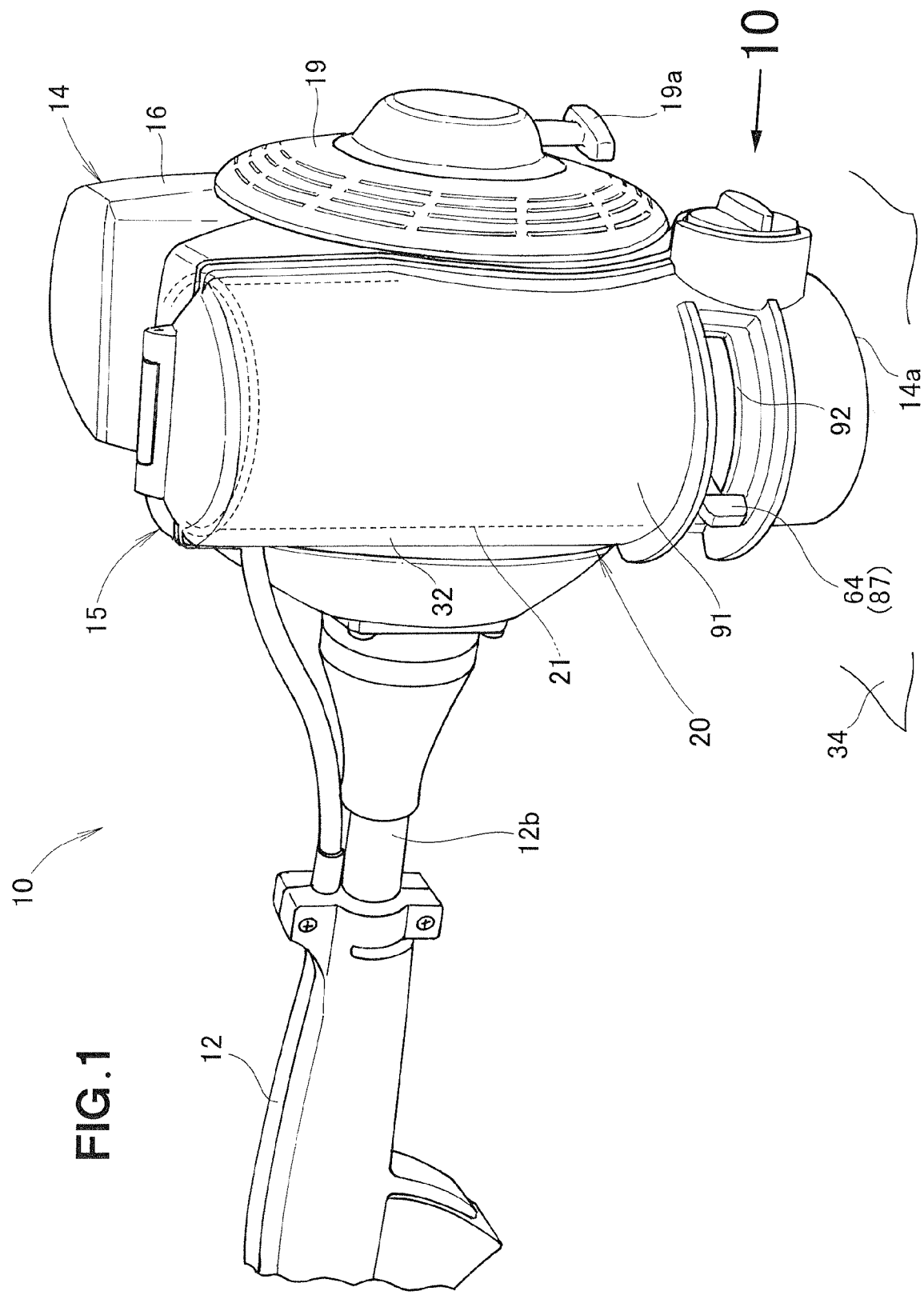
FIG. 1 is a perspective view of a part of a brush cutter exemplifying a gas-engine-powered handheld working machine according to the present invention.

A gas-engine-powered handheld working machine embodying the present invention will be described below with reference to the accompanying sheets of drawings. In the illustrated embodiment, the handheld working machine takes the form of a brush cutter. It is to be understood, however, that the invention can be applied to other handheld working machines, such as air-blowers, chainsaws, and the like As shown in FIGS. 1, 2A and 2B, the brush cutter 10 includes a cutting blade (working attachment) 13 provided at a front end 12a of a working pole 12, a machine body 14 provided at a rear end 12b of the working pole 12 and including an engine (gaseous-fueled engine) 15, a cartridge holding unit 20 formed integrally with an engine case 16 of the engine 15, a gas cylinder or cartridge 21 removably held in the cartridge holding unit 20, an attachment ring 17 provided on the working pole 12 adjacent to the rear end 12b of the working pole 12, and a loop handle 18 provided on a longitudinally intermediate portion of the working pole 12.

The brush cutter 10 has a normal rest position shown in FIG. 1, in which the brush cutter 10 is placed on a horizontal plane 34 with a bottom surface 14a of the machine body 14 lying flat on the horizontal plane 34. As will be understood from the description given below, an important feature of the present invention resides in that while the brush cutter 10 is disposed in the normal rest position, the gas cartridge 21 held in the cartridge holding unit 20 is disposed in a substantially vertical position with a discharge nozzle 23 (FIG. 4) directed downwards while a central axis 35 (FIG. 4) of the gas cartridge 21 is substantially perpendicular to the horizontal plane 34. The central axis 35 of the gas cartridge 21 is coaxial with and, hence, passes through the discharge nozzle 23.

The engine 15 of the brush cutter 10 is able to run on a gas fuel 25 (FIG. 4) supplied in the liquid phase from the nozzle 23 of the gas cartridge 21 via a gas fuel flow passage 41 (FIG. 4) so that the engine 15 rotatably drives the cutting blade 13. The engine 15 has a recoil starter 19 and can start up when a human operator 27 (FIGS. 2A and 2B) pulls a knob 19a of the recoil starter 19.

Figure 2A:
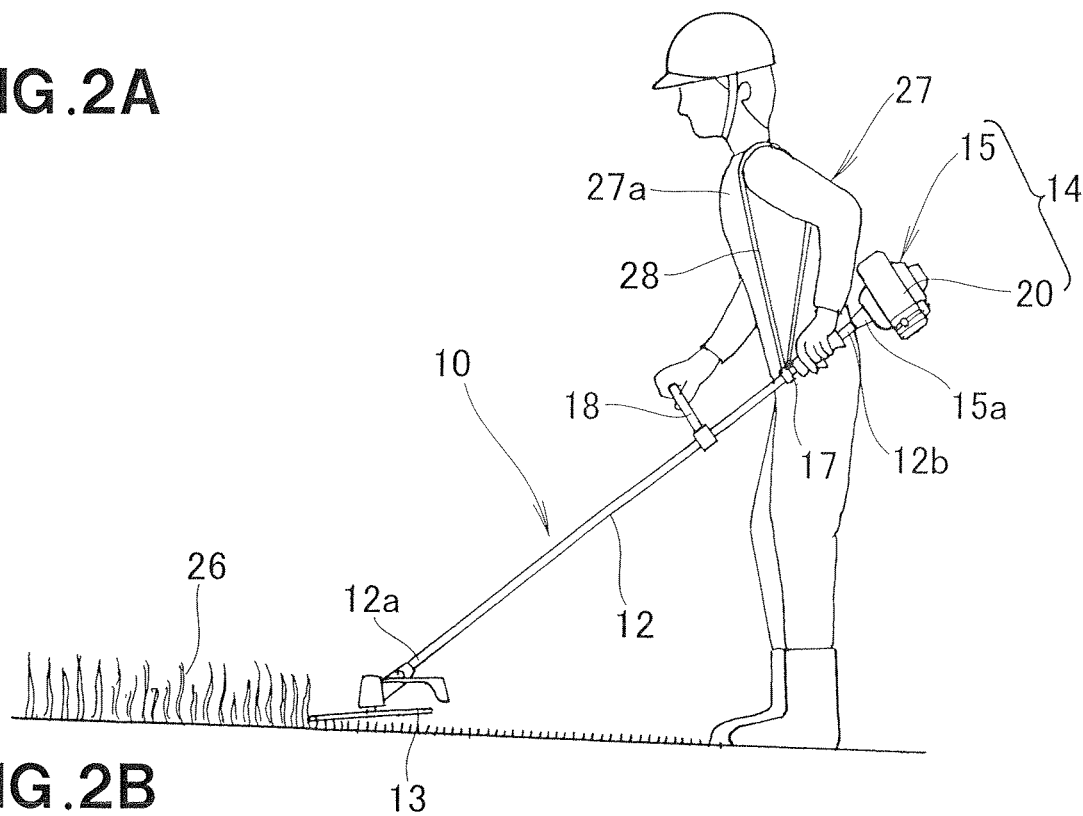
FIG. 2A is a diagrammatical view showing one example of the way the brush cutter is used.
Figure 2B:
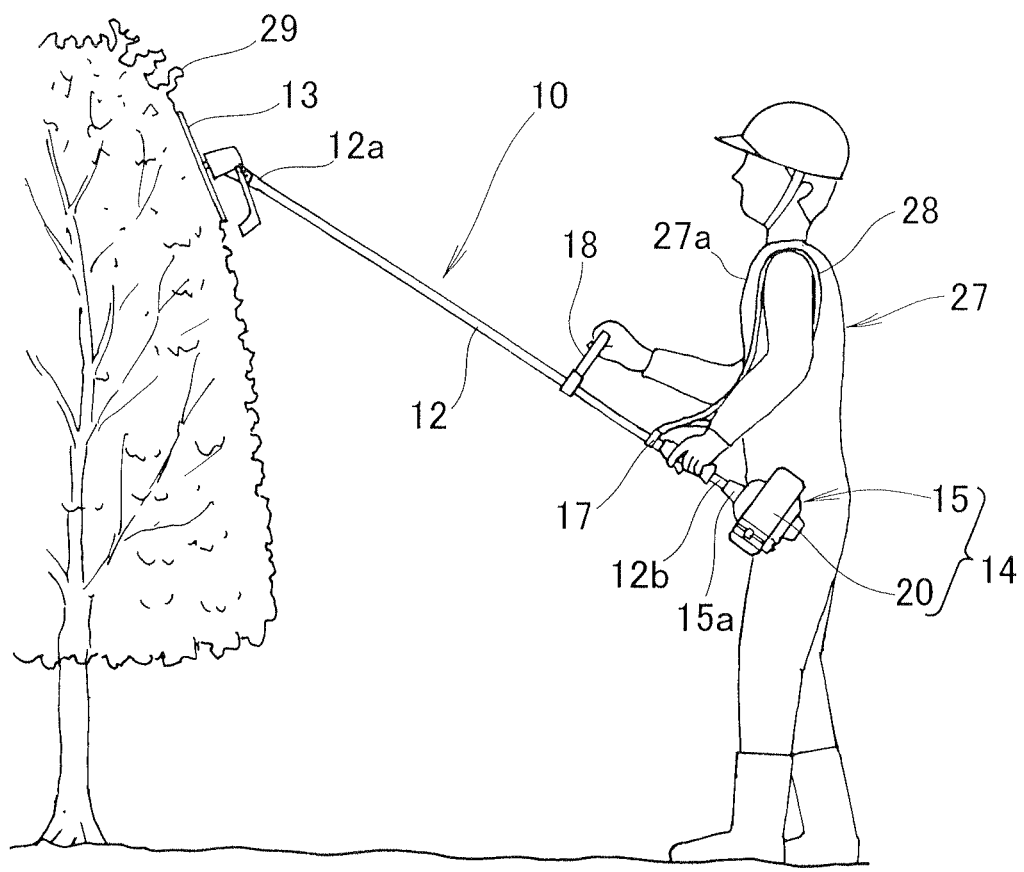
FIG. 2B is a diagrammatical view showing another example of the way the brush cutter is used.

As shown in FIG. 2A, when the brush cutter 10 is used as an unwanted grass and plants cutter, the human operator 27 suspends the brush cutter 10 from its upper body 27a using a shoulder hanging strap 28 hooked on the attachment ring 17, and while keeping this condition, the human operator 27 grips the handle 18. During the unwanted grass and plants cutting operation, the cutting blade 13 is disposed in a position lower than a position of the engine 15 and, hence, the engine 15 is disposed in a first inclined position in which the power output portion 15a of the engine 14 is directed obliquely downward. Reference character 26 shown in FIG. 2A is used to collectively denote unwanted grass and plants.

On the other hand, when the brush cutter 10 is used as a tree branch cutter, as shown in FIG. 2B, the cutting blade 13 is disposed in a position higher than the position of the engine 15 and, hence, the engine 15 is disposed in a second inclined position in which the power output portion 15a of the engine 15 is directed obliquely upward. In FIG. 2B, reference character 29 is used to collectively denote branches of a tree.

As is apparent from FIGS. 2A and 2B, the machine body 14 including the engine 15 and the cartridge holding unit 20 changes its posture depending on the way of use of the brush cutter 10. It is, therefore, highly desirable to ensure that a liquefied gas fuel 25 (FIG. 4) held in the gas cartridge 21 can be reliably supplied in the liquid phase to the engine 15 with utmost efficiency regardless of variations in the posture of the machine body 14 during use.

Figure 3:
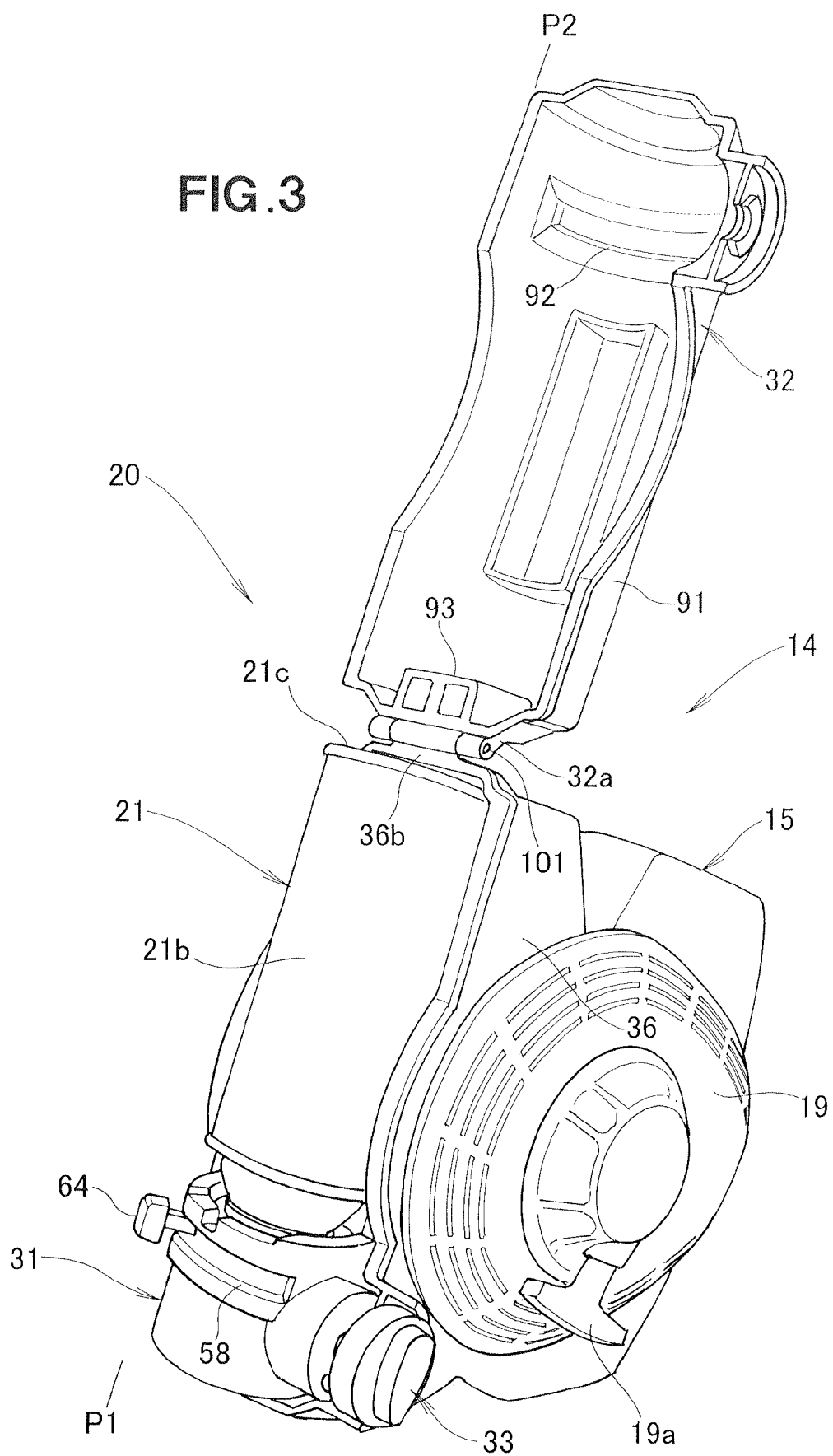
FIG. 3 is a perspective view of a cartridge holding unit of the brush cutter shown with a cartridge cover disposed in an open position.

As shown in FIG. 3, the cartridge holding unit 20 generally comprises a cartridge receiving part 31 for receiving therein the gas cartridge 21, a cartridge cover 32 for covering the gas cartridge 21 while the gas cartridge 21 is received in the cartridge receiving part 31, and a lock means 33 for locking the cartridge cover 32 in a closed position P1.

Figure 4:
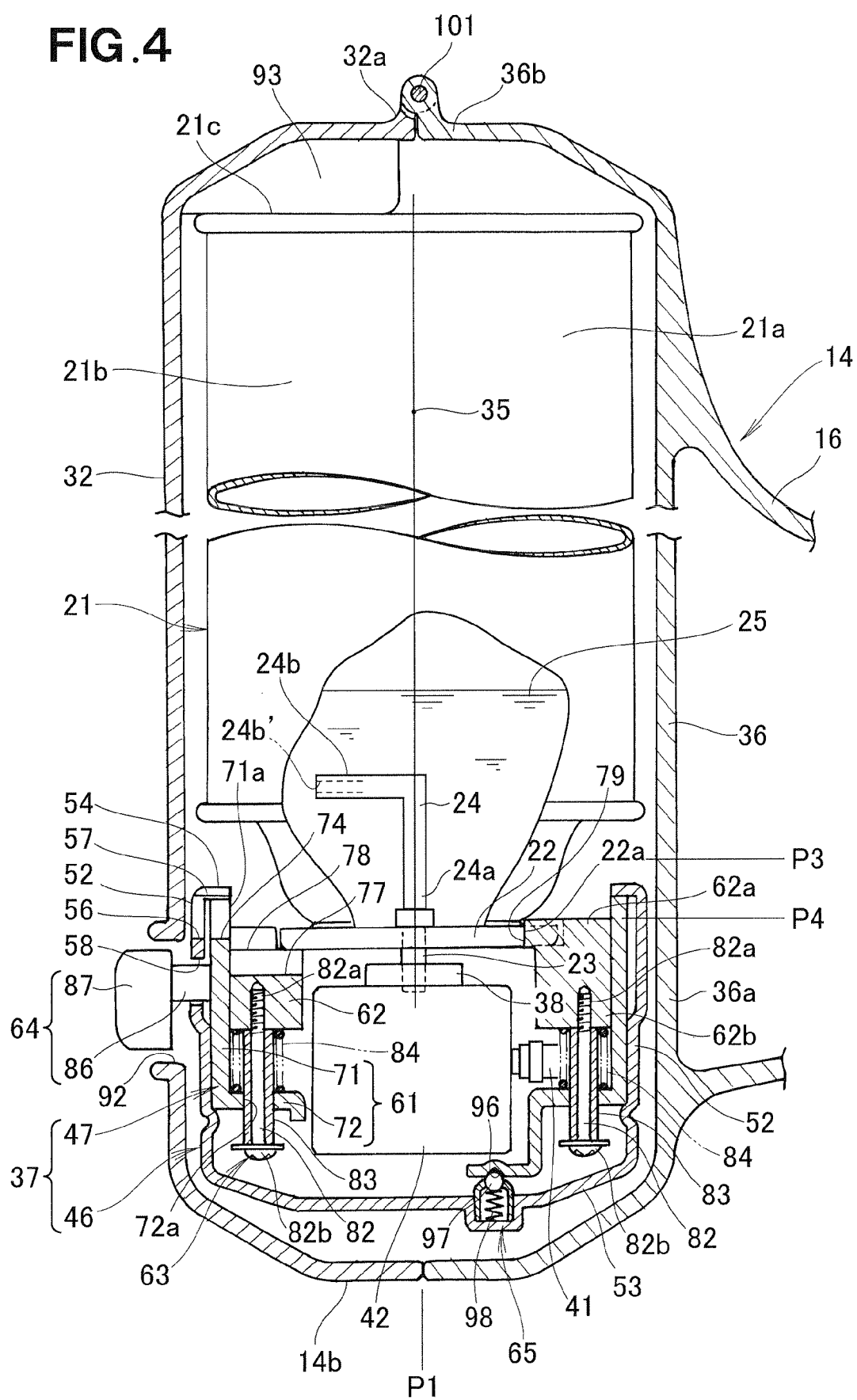
FIG. 4 is a vertical cross-sectional view, with parts cut-away for clarity, of the cartridge holding unit shown with a cartridge held herein.
Figure 5:
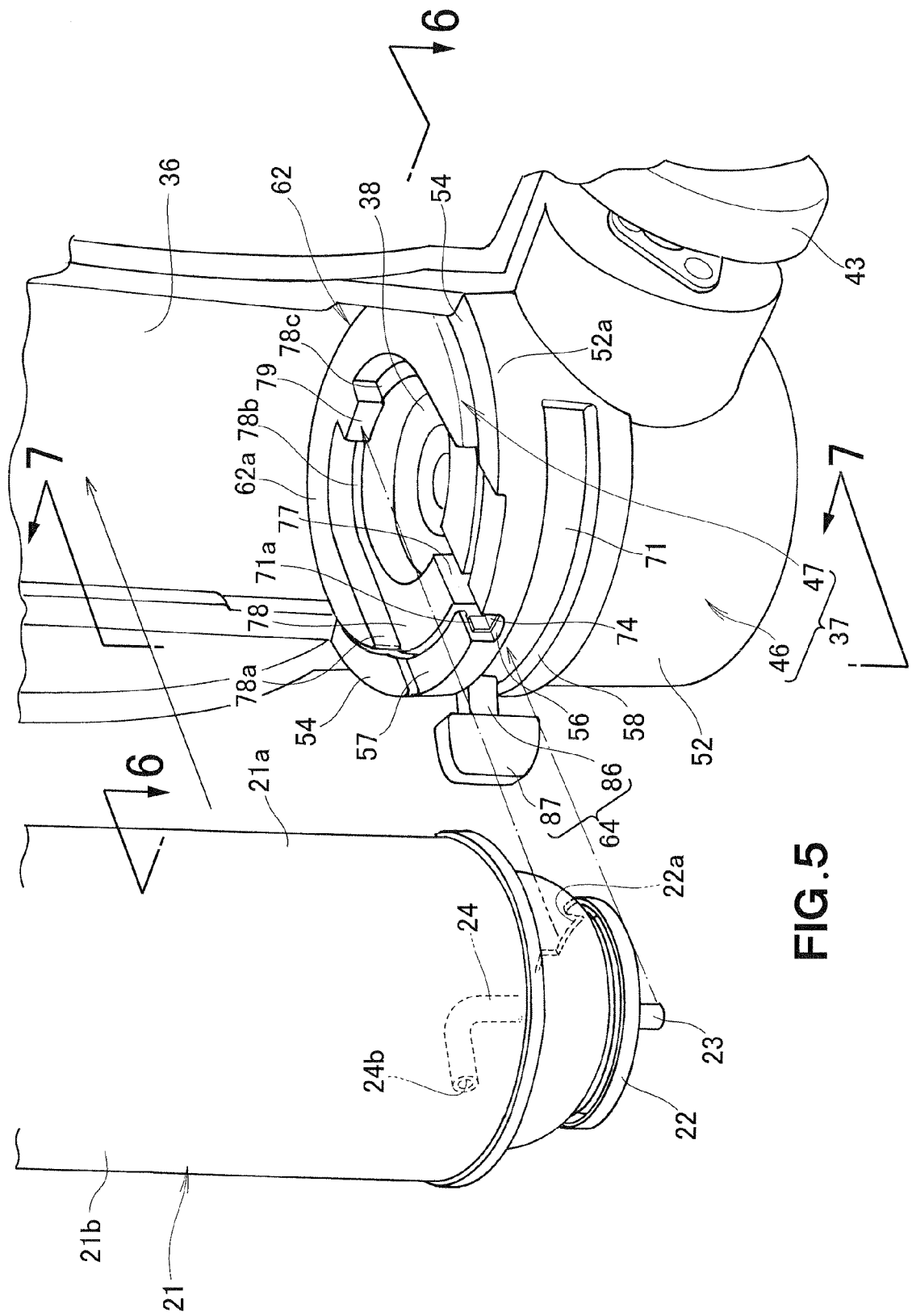
FIG. 5 is a perspective view showing a cartridge support means of the cartridge holding unit.

As shown in FIGS. 4 and 5, the cartridge holding unit 20 is configured such that while the brush cutter 10 is disposed in its normal rest position (where the brush cutter 10 is placed on the horizontal plane 34 (FIG. 1) with the bottom surface 14a of the machine body 14 lying flat on the horizontal plane 34), a cartridge case 36 of the cartridge holding unit 20 is able to receive the gas cartridge 21 in such a manner that a connection flange 22 or the discharge nozzle 23 is directed downwards while the central axis 35 of the gas cartridge 21, which passes through the discharge nozzle 23, extends substantially parallel to a vertical line (i.e., the central axis 35 is substantially perpendicular to the horizontal plane 34).

The gas cartridge 21 comprises a commercially available disposable gas cylinder or cartridge holing therein a liquefied gaseous fuel such as LPG (liquefied petroleum gas) including LBG (liquefied butane gas). The gas cartridge 21 has a bent fuel discharge pipe 24 connected to the connection flange 22, and most part of the fuel discharge pipe 24 is received inside the gas cartridge 21.

The fuel discharge pipe 24 has an L-shaped configuration including a straight main part 24a disposed coaxially with the central axis 35 of the gas cartridge 21, and an inner end part 24b bent at right angles to the main part 24a. The main part 24a includes the nozzle 23 at the outer end portion of the fuel discharge pipe 24, while the inner end part 24b has a fuel inlet 24b' (FIG. 4) at an inner end of the fuel discharge pipe 24. As previously described, the central axis 35 of the gas cartridge 23 is aligned with the discharge nozzle 23 and, hence, passes through the discharge nozzle 23. The liquefied gas fuel 25 held in the gas cartridge 21 is introduced in the liquid phase from the fuel inlet 24b' into the fuel discharge pipe 24 and supplied in the liquid phase from the nozzle 23 for combustion in the engine 15.

The cartridge receiving part 31 includes the cartridge case 36 formed integrally with the engine case 16, a cartridge support means 37 disposed inside the cartridge case 36, a nozzle retainer 38 disposed in the cartridge support means 37, the gas fuel flow passage 41 communicating with the nozzle retainer 38, an on-off changeover valve 42 disposed across the gas fuel flow passage 41, and a selector knob 43 for switching the on-off state of the on-off changeover valve 42.

Figure 10:
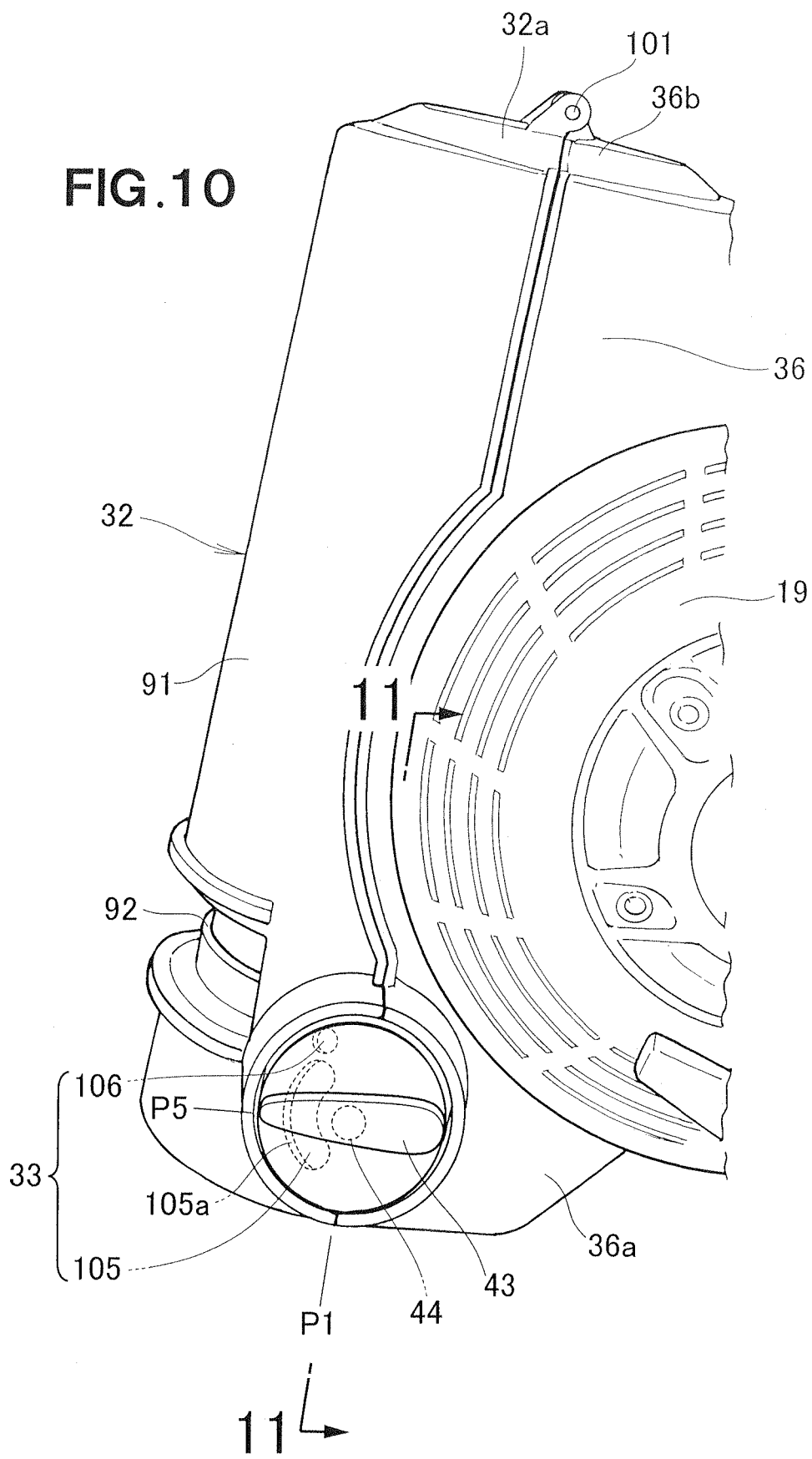
FIG. 10 is a view in the direction of an arrow 10 shown in FIG. 1.

The cartridge case 36 is configured to receive a first side 21a of the gas cartridge 21, which faces toward and is located near the engine 15, while the gas cartridge 21 is set in a vertical position within the cartridge case 36. The first side 21a of the gas cartridge 21 will be referred to as "engine-near-side half" of the gas cartridge 21. A second or opposite side 21b of the gas cartridge 21, which faces away from and is located remotely from the engine 15, can be covered by the cartridge cover 32 when the cartridge cover 32 is disposed in the closed position P1 (FIGS. 3 and 10). The second side 21b of the gas cartridge 21 will be referred to as "engine-far-side half" of the gas cartridge 21. The cartridge case 36 has a lower portion 36a in which the cartridge support means 37 is disposed.

The cartridge support means 37 is comprised of a generally cup-shaped base 46 and a cartridge rotation mechanism 47 rotatably supported on the cup-shaped base 46. The cup-shaped base 46 include a cylindrical sidewall 52, a bottom wall 53 closing a lower end of the cylindrical sidewall 52, and an annular end flange 54 formed at an upper edge 52a of the sidewall 52 and projecting in a radial inward direction from the upper edge 52a. The base 46 further includes a first guide groove 56 formed in the upper edge 52a of the sidewall 52 and extending radially across the width of the sidewall 52, and a second guide groove 57 formed in the annular end flange 54 and extending radially across the width of the annular end flange 54. The first guide groove 56 is provided to allow passage therethrough of the discharge nozzle 23 of the gas cartridge 21 without interference when the gas cartridge 21 is loaded in or unloaded from the cartridge case 36 while keeping the vertical position, as indicated by the arrowheads shown in FIG. 5. Similarly, the second guide groove 57 is provided to allow passage therethrough of the connection flange 22 without interference when the gas cartridge 21 is loaded in or unloaded from the cartridge case 36 while keeping the vertical position, as indicated by the arrowheads shown in FIG. 5.

The cartridge rotation mechanism 47 includes a hollow cylindrical rotary member 61, a ring-shaped lift member 62 slidably received in the rotary member 61 to undergo sliding movement in an axial direction (vertical direction) relative to the rotary member 61, a support means 63 for axially movably supporting the lift member 62 relative to the rotary member 61, an operation lever 64 provided on the rotary member 61, and a detent means or mechanism 65 for temporarily locking the rotary member 61 in position against rotation relative to the cup-shaped base 46 of the cartridge support means 37. The cartridge rotation mechanism 47 is configured to turn or rotate the gas cartridge 21 about its central axis 35 while the gas cartridge 21 is received in the cartridge case 36.

The rotary member 61 of the cartridge rotation mechanism 47 includes a cylindrical sidewall 71 slidably received in the cylindrical sidewall 52 of the cup-shaped base 46, and an annular bottom wall 72 formed at a lower end of the sidewall 71. The sidewall 71 has an upper end portion 71a disposed directly below the annular flange 54 of the cup-shaped base 46, a radial guide groove 74 formed in the upper end portion 71a and extending across the thickness of the sidewall 71. The guide groove 74 is provided to allow passage therethrough of the discharge nozzle 23 of the gas cartridge 21 without interference, in the same manner as done by the first guide groove 56 in the cup-shaped base 46, when the gas cartridge 21 is loaded in or unloaded from the cartridge case 36 while keeping the vertical position, as indicated by the arrowhead shown in FIG. 5.

The ring-shaped lift member 62 is slidably received in the cylindrical sidewall 71 of the rotary member 61 and has an upper end portion 62a formed with a first guide groove 77, a second guide groove 78, and a positioning lug 79 projecting into the second guide groove 78.

The first guide groove 77 extends radially across the width of the ring-shaped lift member 62 and, like the first guide groove 56 of the cup-shaped base 46, it allows the passage therethrough of the discharge nozzle 23 of the gas cartridge 21 without interference when the gas cartridge 21 is loaded in or unloaded from the cartridge case 36 while keeping the vertical position, as indicated by the arrowheads shown in FIG. 5.

The second guide groove 78 has a generally U-shaped configuration (FIG. 6) in plan view and, like the second guide groove 57 of the cup-shaped base 46, it allows the passage of the connecting flange 22 of the gas cartridge 21 without interference when the gas cartridge 21 is loaded in or unloaded from the cartridge case 36 while keeping the vertical position, as indicated by the arrowheads shown in FIG. 5. The second guide groove 78 of the U-shaped configuration includes a guide portion 78a located at an open end portion thereof for guiding the connection flange 22 of the gas cartridge 21 as the connecting flange 22 moves into and out of the second guide groove 78, and a support portion 78b for supporting or retaining thereon the connection flange 22 of the gas cartridge 21 when the connection flange 22 is received in the second guide groove 78. The support portion 78b is concentric with the central axis 35 of the gas cartridge 21 when the connection flange 22 is received in the second guide groove 78.

The positioning lug 79 is disposed at a part 78c of the support portion 78b which is located diametrically opposite to an open end of the guide portion 78a. Thus, the positioning lug 79 projects into the second guide groove 78 toward the open end of the guide portion 78a and is configured to fit with a positioning recess or notch 22a of the connection flange 22 of the gas cartridge 21. When the positioning notch 22a of the gas cartridge 21 is fitted with the positioning lug 79 of the lift member 62, the gas cartridge 21 is set in a correctly oriented condition relative to the cartridge case 36.

The support means 63 includes a plurality of screws 82 connecting the bottom wall 72 of the rotary member 61 and the lift member 62, collars 83 each fitted around a shank of a corresponding one of the screws 82, and coiled compression spring members 84 loosely fitted around respective ones of the collars 83 and acting between the lift member 62 and the bottom wall 72 of the rotary member 61. Each of the collars 83 slidably extends through a corresponding one of a plurality of axial through-holes 72a formed in the bottom wall 72 of the rotary member 61. Each of the screws 82 has a threaded front end portion 82a threaded into a lower end portion 62b of the lift member 62, and an enlarged head portion 82b disposed below the bottom wall 72 of the rotary member 61.

The lift member 62 is normally disposed in a standby position P3 (better shown in FIG. 7), in which the lift member 62 is urged upwardly away from the bottom wall 72 of the rotary member 61 by means of the spring members 84 until the head portions 82b of the screws 83 come into abutment with the bottom wall 72 of the rotary member 61. For loading the gas cartridge 21, the gas cartridge 21 is set in the cartridge case 36 with its connecting flange 22 received in the guide portion 78b of the second guide groove 78, then the gas cartridge 21 is forced downward, thereby lowering the lift member 62 against the force of the spring members 84 until the lift member 62 is displaced from the standby position P3 to a loading position P4 (FIG. 4).

Figure 8:
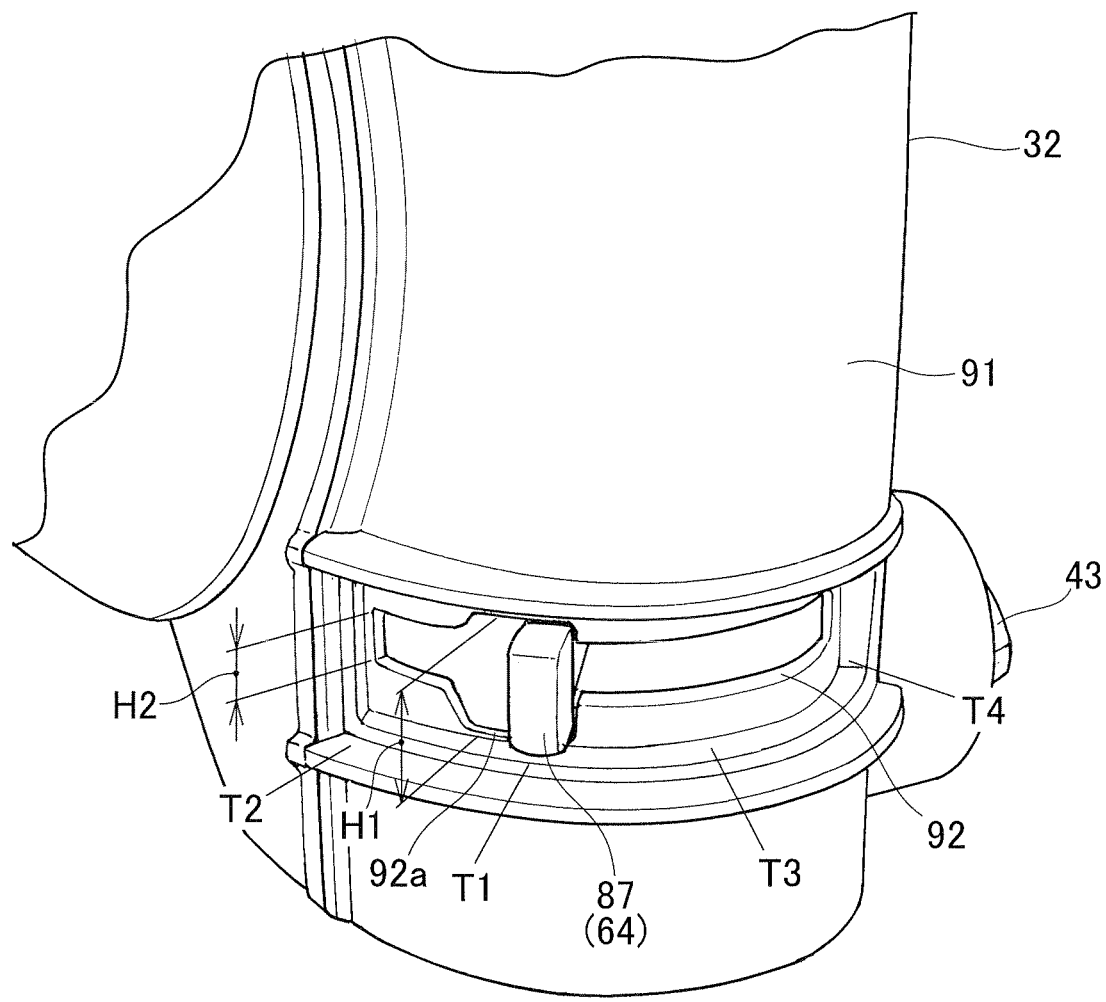
FIG. 8 is a perspective view showing an operation knob and a cover guide of the cartridge holding unit.

As shown in FIG. 4, the operation lever 64 of the cartridge rotation mechanism 47 includes a lever body 86 formed integrally with the sidewall 71 of the rotary member 61, and a knob 87 formed on a distal end of the lever body 86. The lever body 86 projects in an radial outward direction from the sidewall 71 of the rotary member 61 and extends successively through a third guide groove 58 formed in the sidewall 52 of the cup-shape base 46, and through a guide groove 92 of the cartridge cover 32, so that the knob 87 is disposed outside the cartridge cover 32 for allowing manipulation by the human operator when the cartridge cover 32 is in the closed position. The third guide groove 58 is an elongated guide groove formed in the sidewall 52 of the cup-shaped base 46 and extending in a circumferential direction of the sidewall 52. The guide groove 92 of the cartridge cover 32 is also an elongated guide groove formed in a semi-cylindrical sidewall 91 of the cartridge cover 32 and extending in a circumferential direction of the sidewall 91 (FIG. 8).

Figure 6:
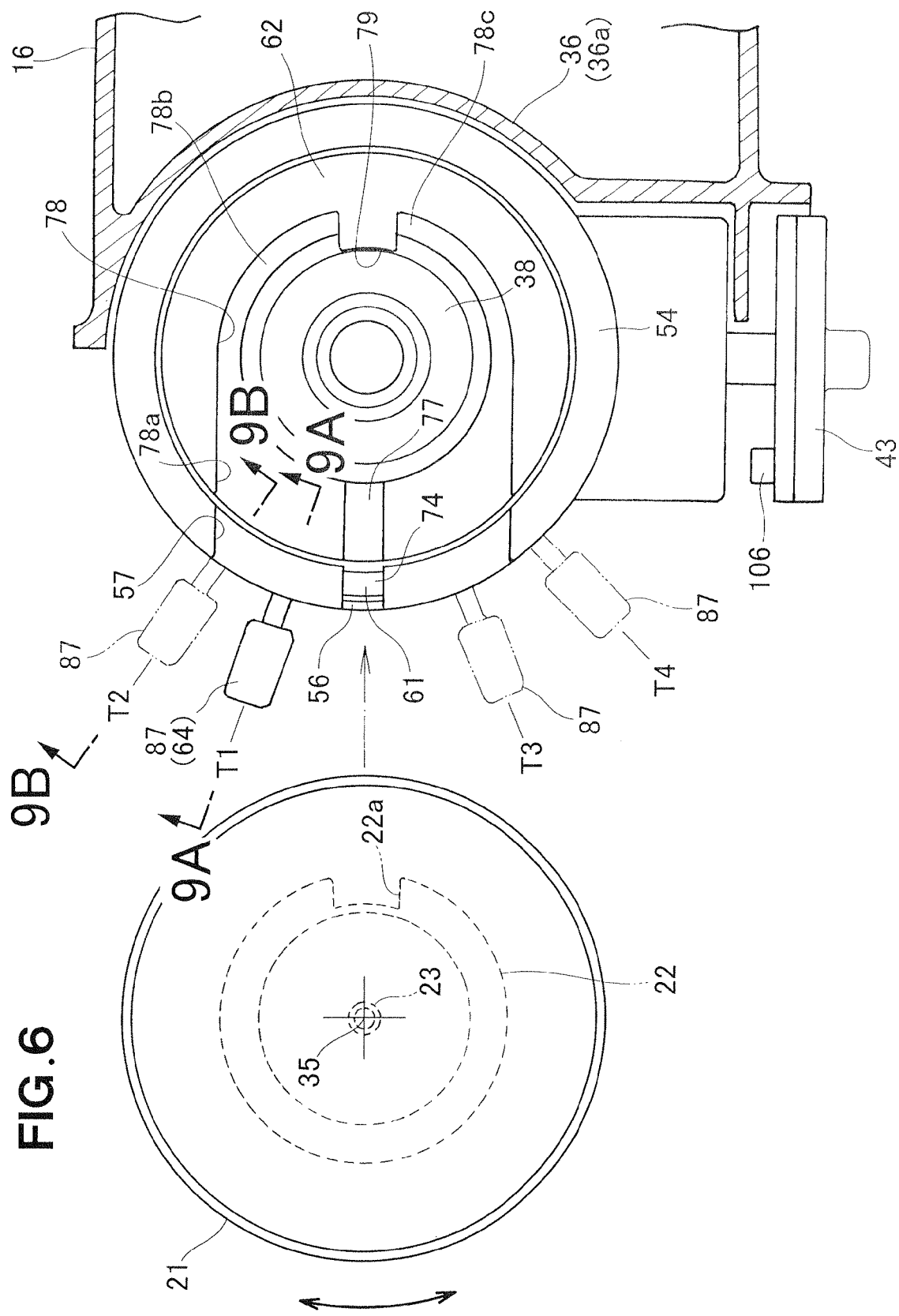
FIG. 6 is a cross-sectional view taken along line 6-6 of FIG. 5.

As shown in FIG. 4, the knob 87 of the operation lever 64 is disposed outside the sidewall 91 of the cartridge cover 32, so that the human operator can hold the knob 87 between the tips of its first two fingers from the outside of the sidewall 91 and moves the knob 87 in a circumferential direction along the guide grooves 58, 92, as shown in FIG. 6, thereby causing the rotary member 61 and the lift member 62 to turn concurrently as a single unit about the central axis 35 (FIG. 4) of the gas cartridge 21. In the illustrated embodiment, the operation lever 64 including the knob 87 is movable to selectively assume a home position T1, a first twist position T2, a second twist position T3 and a third twist position T4.

The gas cartridge 21 is set on the lift member 62 while the positioning notch 22a of the connection flange 22 is fitted with the positioning lug 79 of the lift member 62. By virtue of the fitting engagement between the positioning notch 22a and the positioning lug 79, the connection flange 22 (namely, the gas cartridge 21) is set in a correctly oriented state. With this arrangement, when the human operator manipulates the operation lever 64 to turn the rotary body 61, the gas cartridge 21 and the lift member 62 are turned concurrently about the central axis 35 of the gas cartridge 21, as indicated by the arrowheads shown in FIG. 6. In this instance, the home position T1 is determined such that an amount of gas fuel left unused in the liquid phase within the gas cartridge 21 can be minimized when the brush cutter 10 (FIG. 1) is used while taking a working position or posture that may occur most frequently during use of the brush cutter 10.

As shown in FIG. 4, the detent mechanism 65 has a plurality of positioning recesses 96 formed in the bottom wall 72 of the rotary member 61, a plurality of balls 97 engageable with the positioning recesses 96, respectively, and a plurality of spring members 98 urging respective ones of the balls 97 into fitting engagement with corresponding ones of the positioning recesses 96. The balls 97 thus urged by the spring members 98 are called spring-loaded balls. The detent mechanism 65 is configured such that when the operation lever 64 is manually operated to turn the rotary member 61 until the operation lever 64 reaches any one position selected from among the home position T1, first twist position T2, second twist position T3, and third twist position T4, the spring-loaded balls 97 click into the positioning recesses 96. The balls 97 are then retained by the positioning recesses 96.

With this clicking movement of the balls 97 relative to the positioning recesses 96, the human operator can readily understand that the operation lever 64 is disposed the selected position, i.e., one of the home position T1, first twist position T2, second twist position T3, and third twist position T4.

Figure 7:
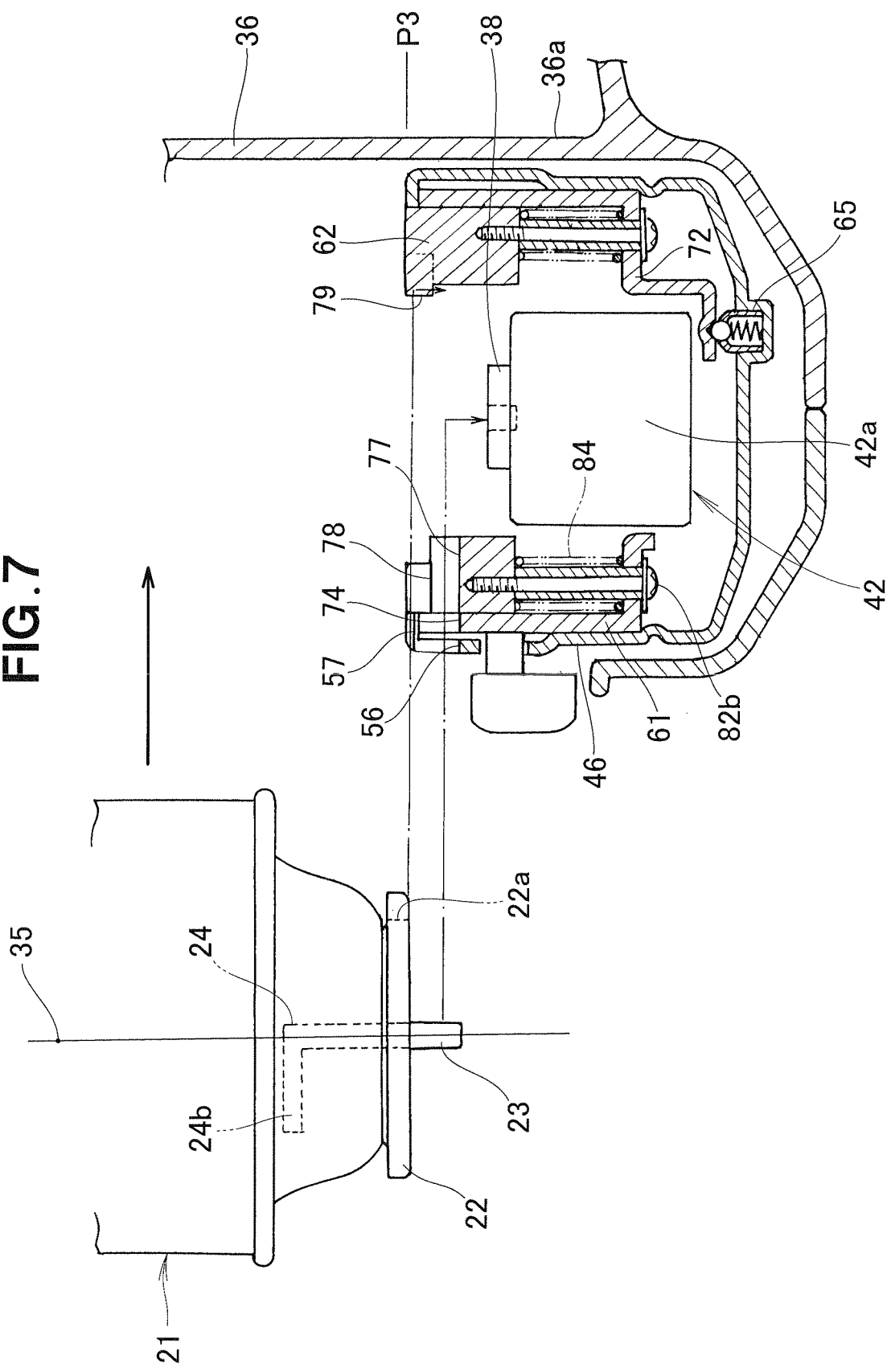
FIG. 7 is a cross-sectional view taken along line 7-7 of FIG. 5.

As shown in FIGS. 6 and 7, when the operation lever 64 is disposed in the home position T1, the guide groove 74 of the rotary member 61, the first guide groove 77 of the lift member 62 are aligned with the first guide groove 56 of the cap-shaped base 46 in a radial direction of the cartridge case 36. In this instance, the second guide groove 78 of the lift member 62 is also aligned with the second guide groove 57 of the cap-shaped base 46 in the radial direction of the cartridge case 36.

With the guide grooves 74, 77 and 56 thus aligned, when the gas cartridge 21 while keeping the vertical position is displaced horizontally in a direction perpendicular to the central axis 35, as indicated by the arrows shown in FIGS. 6 and 7, until it is received in the cartridge case 36, the discharge nozzle 23 of the gas cartridge 21 can smoothly move along the three consecutive guide grooves 56, 74 and 77 in a guided manner until it arrives at a standby position vertically aligned with the nozzle retainer 38. During that time, the connection flange 22 of the gas cartridge 21 can also smoothly move along the two aligned guide grooves 57, 78 in a guided manner until it arrives at the standby position. When the connection flange 22 is disposed in the standby position, the positioning notch 22a of the connection flange 22 is fitted with the positioning lug 79 of the lift member 62 so that the connecting flange 22 (i.e., the gas cartridge 21) is placed in a correctly oriented condition.

The nozzle retainer 38 is provided on a body (valve case) 42a of the on-off changeover valve 42 and adapted to retain the discharge nozzle 23 while keeping fluid communication between itself and the discharge nozzle 23. The nozzle retainer 38 also communicates via the on-off changeover valve 42 with the gas fuel flow passage 41 (FIG. 4). With this arrangement, since the discharge nozzle 23 is held in vertical alignment with the nozzle retainer 38 when the gas cartridge 21 is set in the standby position, by forcing the gas cartridge 21 in a downward direction until the lift member 62 moves from the standby position P3 to the loading position P4 (FIG. 4), the discharge nozzle 23 of the gas cartridge 21 is brought into fitting engagement with the nozzle retainer 28 and, hence, is held in fluid communication with the nozzle retainer 38.

As thus far described, by virtue of a combination of the guide grooves 56, 74, and 77 that are provided for guiding the discharge nozzle 23 of the gas cartridge 21, and the guide grooves 57 and 78 that are provided for guiding the connection flange 22 of the gas cartridge, it is readily possible to place the discharge nozzle 23 of the gas cartridge 21 in the standby position disposed directly above and vertically aligned with the nozzle retainer 38 by merely displacing the gas cartridge 21 in a direction perpendicular to the central axis 35 while keeping the vertical position of the gas cartridge. The gas cartridge 21 is then moved downward along the central axis 35 until the lift member 62 assumes the loading position P4 (FIG. 4) whereupon the discharge nozzle 23 is retained in the nozzle retainer 38 while keeping a fluid communication between the discharge nozzle 23 and the nozzle retainer 38. The foregoing way of loading the gas cartridge 21 is advantageous over a conventional way of loading in which the discharge nozzle 23 is likely to be damaged due to a bending force applied when the discharge nozzle 23 is inserted into a nozzle retainer from an oblique direction while keeping the gas cartridge 21 in an inclined position.

Referring back to FIGS. 3 and 4, the cartridge cover 32 has an upper end portion 32a pivotably connected by a hinge pin 101 to an upper end portion 36b of the cartridge case 36 so that the cartridge cover 32 is pivotally movable between the closed position (FIG. 4) and an open position P2 (FIG. 2). When disposed in the closed position P1, the cartridge cover 32 closes the cartridge case 36. Alternatively, when disposed in the open position P2, the cartridge cover 32 opens the cartridge case 36.

When the gas cartridge 23 is set in a vertical position within the cartridge case 36, the engine-near-side half 21a of the gas cartridge 21 is received in the cartridge case 36. While keeping this condition, the cartridge cover 32 is placed in the closing position P1 whereupon the engine-far-side half 21b of the gas cartridge 21 is covered with the cartridge cover 32.

The cartridge cover 32 further has a presser portion 93 disposed on the upper end portion 32a inside the cartridge cover 32, and the circumferential guide groove 92 formed in the cartridge cover 32. The presser portion 93 is a protruded portion that is provided to press or urge a bottom wall 21c of the gas cartridge 21 in a downward direction when the cartridge cover 32 is displaced from the open position P2 to the closed position P1. By thus urging the bottom wall 21c of the gas cartridge 21 downwardly by the presser portion 93, the connector flange 22 of the gas cartridge 21 forces the lift member 62 to move downward against the force of the spring members 84 until it reaches the loading position P4. When the lift member 62 is disposed in the standby position P3, the discharge nozzle 23 of the gas cartridge 21 is disposed immediately above the cartridge retainer 38. When the lift member 62 is disposed in the loading position P4, the discharge nozzle 23 of the gas cartridge 21 is retained in the nozzle retainer 38 while keeping a fluid communication between the discharge nozzle 23 and the nozzle retainer 38.

The circumferential guide groove 92 of the cartridge cover 32 is formed in the semi-cylindrical sidewall 91 of the cartridge cover 32 for allowing movement of the operation lever 64 in a circumferential direction of the cartridge cover 32 when the cartridge cover 32 is disposed in the closed position P1.

Figure 9:
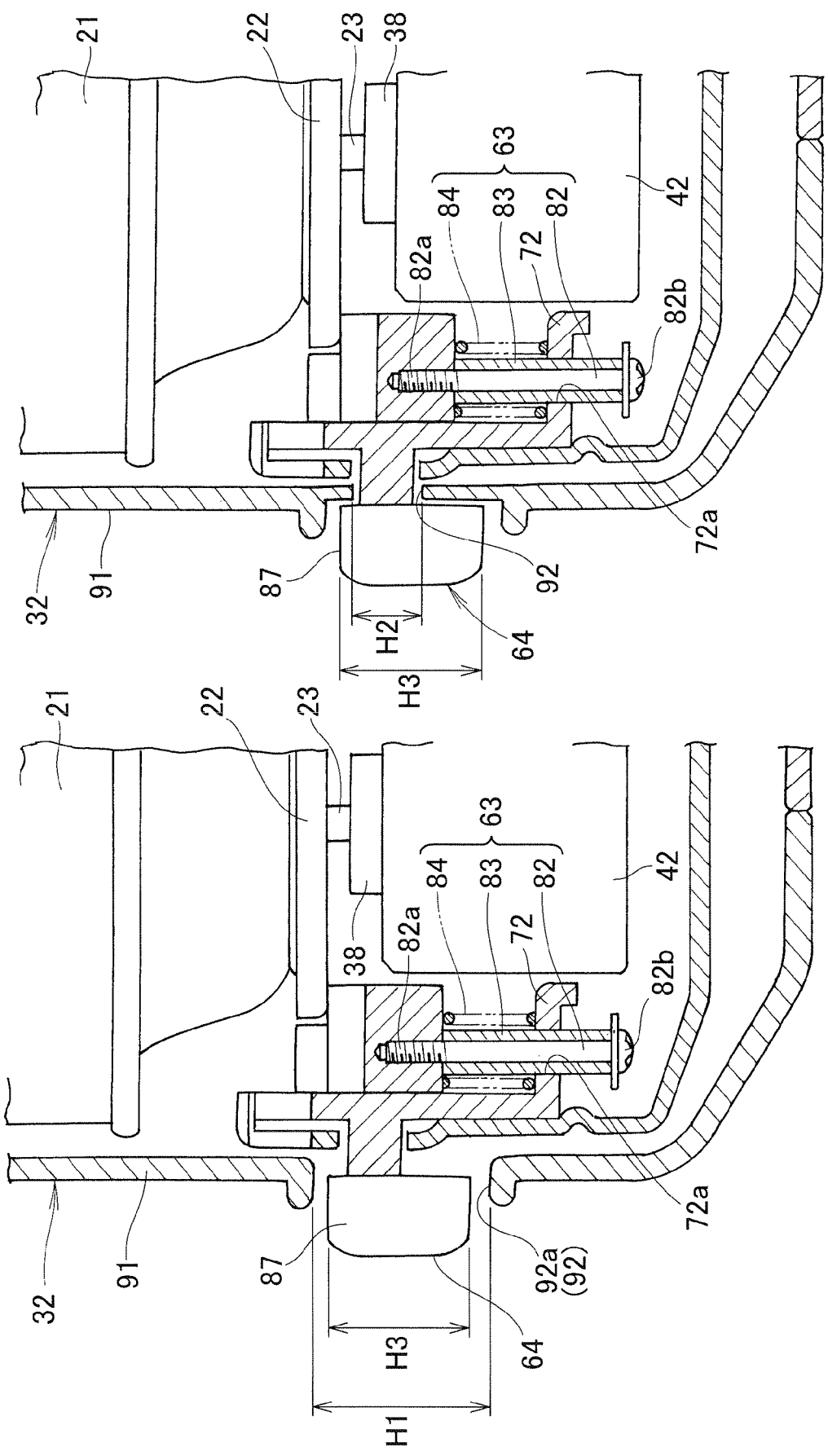
FIG. 9A is a cross-sectional view taken along line 9A-9A of FIG. 6.
FIG. 9B is a cross-sectional view taken along line 9B-9B of FIG. 6.

As shown in FIG. 8, the operation lever 64 is movable along the guide groove 92 of the cartridge cover 32 so as to assume one position selected from among the home position T1, the first twist position T1, the second twist position T2, and the third twist position T4. The guide groove 92 has a longitudinal portion 92a corresponding in position to the home position T1 of the operation lever 64. The longitudinal portion 92a is enlarged in width as compared to a remaining portion of the guide groove 92 and has a width H1, which is larger than a width H2 of the remaining portion of the guide groove 92. As shown in FIG. 9A, the width H1 of the enlarged longitudinal portion 92a of the guide groove 92 is greater than a height H3 of the knob 87 of the operation lever 64, whereas, as shown in FIG. 9B, the width H2 of the remaining portion of the guide groove 92 is smaller than the height H3 of the knob 87 of the operation lever 64. With this arrangement, the cartridge cover 32 can be opened and closed only when the operation lever 64 is disposed in the home position T1. When the operation lever 64 is disposed in the first twist position T2, the second twist position T3 or the third twist position T4, an attempt to open or close the cartridge cover 32 will result in failure due to interference between the knob 87 of the operation lever 64 and the sidewall 91 of the cartridge cover 32.

Figure 11:
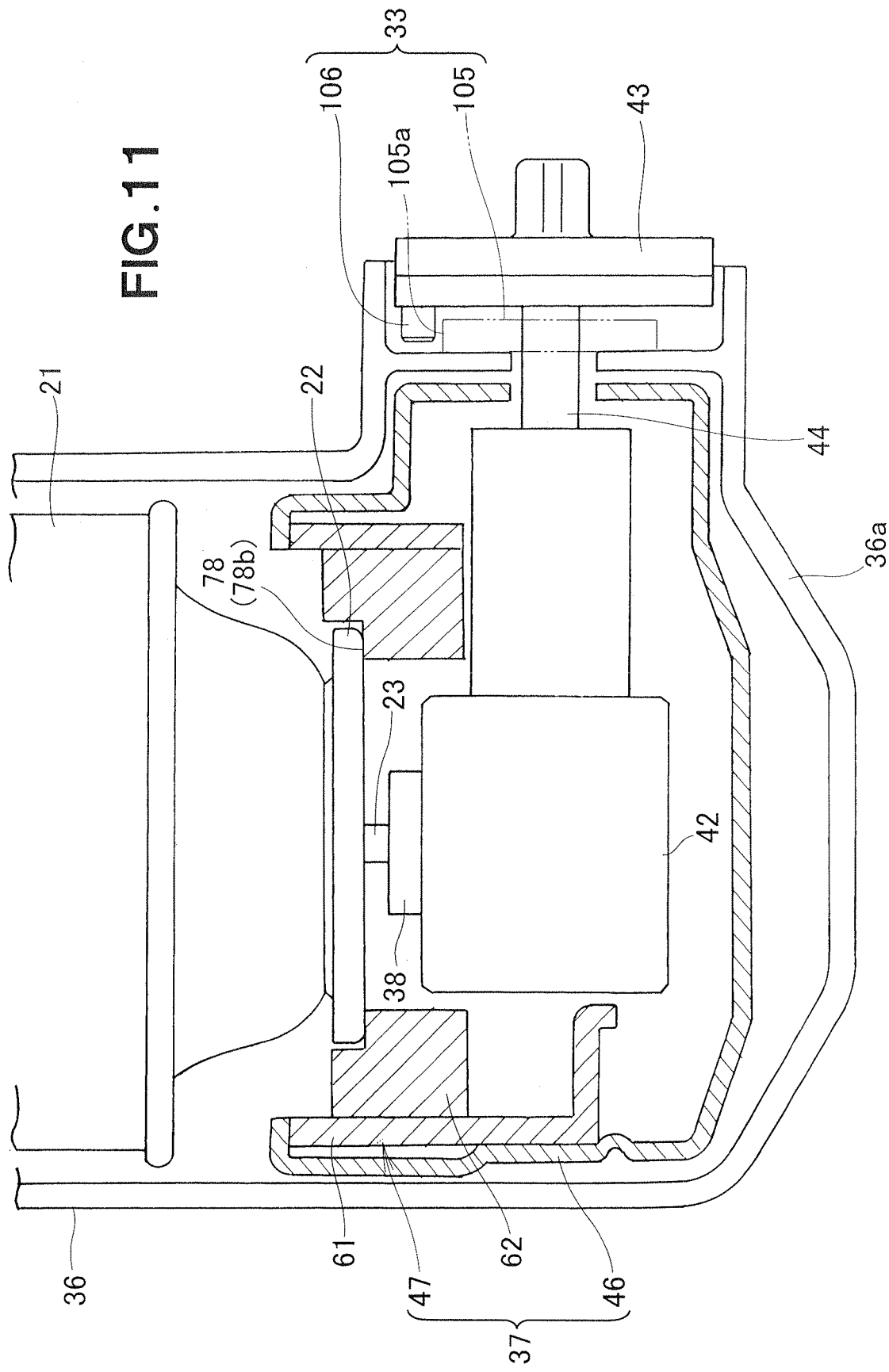
FIG. 11 is a cross-sectional view taken along line 11-11 of FIG. 10.

As shown in FIGS. 10 and 11, the lock means 33 includes a locking ridge 105 formed on an outer surface of the semi-cylindrical sidewall 91 of the cartridge cover 32 and projecting toward the selector knob 43, and a stopper projection 106 formed on the selector knob 43 and protruding from the selector knob 43 toward the locking ridge 105. The selector knob 43 is provided on an outer end of an operation shaft 44 of the on-off changeover valve 42. The operation shaft 44 is connected to a valving element (not shown) of the on-off changeover valve 42 so as to perform on-off operation of the on-off changeover valve 42.

The locking ridge 105 is disposed on a semi-circular boss part 32b (FIGS. 12A and 12B) of the cartridge cover 32, and the boss part 32b faces toward the selector knob 43. The locking ridge 105 has an arcuate shape as viewed in a side view and extends arcuately in a circumferential direction of the semi-circular boss part 32b. The locking ridge 105 projects toward the selector knob 43. The stopper projection 106 is disposed at a portion of the selector knob 43 located in a radially outward direction of an outer peripheral edge 105a of the arcuate locking ridge 105. The stopper projection projects toward the boss part 32b of the cartridge cover 32.

Figure 12A:
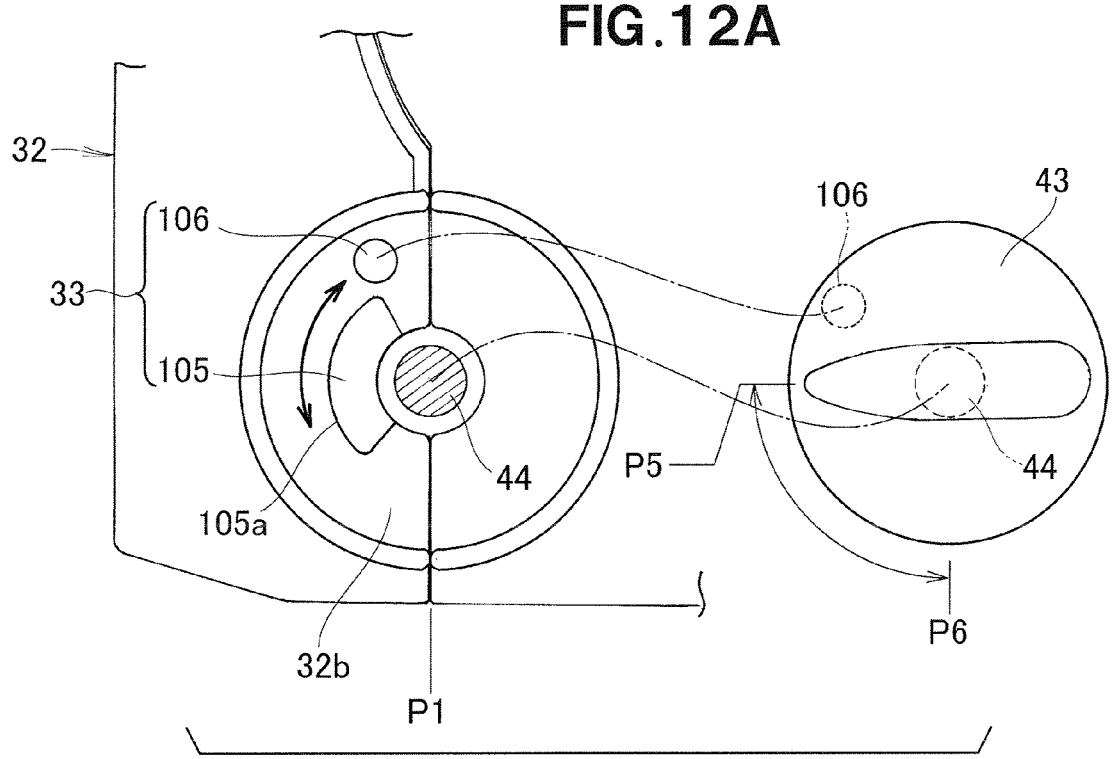
FIGS. 12A and 12B are diagrammatical views illustrative of the operation of a lock means of the cartridge holding unit.
Figure 12B:
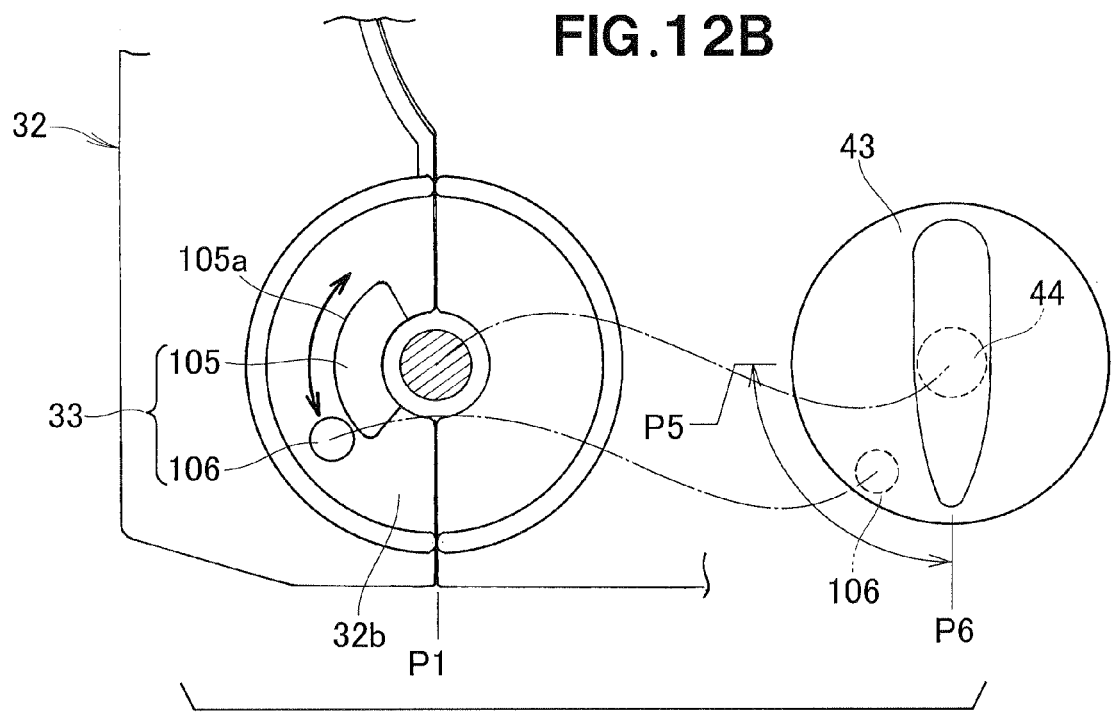

As shown in FIGS. 12A and 12B, when the selector knob 43 is turned to move between a valve closing position P5 and a valve full-opening position P6, the stopper projection 106 moves along the outer peripheral edge 105a of the locking ridge 105. When the selector knob 43 is disposed in the valve closing position P5 shown in FIG. 12A, the stopper projection 106 is located at a position separated upwardly from the outer peripheral edge 105a of the locking ridge 105. The thus positioned stopper projection 106 does not interfere with the locking ridge 105 and allows the cartridge cover 32 can be opened and closed.

Alternatively, when the selector knob 43 is disposed in the valve full-opening position P6 shown in FIG. 12B, the stopper projection 106 is located at a position located within the length of the outer peripheral edge 105a of the locking ridge 105. The thus positioned stopper projection 106 will interfere with the outer peripheral edge 105a of the locking ridge 105 and prevent the cartridge cover 32 from being opened (see, also FIG. 17B). More specifically, when an attempt is made to open the cartridge cover 32 while the selector knob 43 is disposed in the valve full-opening position P6, the outer peripheral edge 105 of the locking ridge 105 will interfere with the stopper projection 105, thereby preventing further movement of the cartridge cover 32 in a direction toward the open position P2 (FIG. 3). By virtue of the locking means 33 comprised of the locking ridge 105 and the stopper projection 106, the cartridge cover 32 can be locked in the closed position P1 as long as the selector knob 34 is disposed in the valve full-opening position P6.

It will be appreciated from the foregoing description that the cartridge cover 32 can be opened only when the operation lever 64 shown in FIG. 8 is disposed in the home position T1 and the selector knob 43 is disposed in the valve closing position P5. As previously described, the home position T1 is a position in which an amount of fuel gas 25 left unused in the liquid phase within the gas cartridge 21 can be minimized when the brush cutter 10 is used while taking a working position that may occur most frequently during use. In the illustrated embodiment, the cartridge cover 32 can be opened when the operation lever 64 is disposed in the home position T1 shown in FIG. 8. This arrangement can reduce the number of operations of the operation lever 64 by the human operator, which will improve the usability of the brush cutter 10.

Furthermore, since the cartridge cover 32 can be opened when the selector knob 43 is disposed in the valve closing position P5, this arrangement is able to preclude the possibility that the cartridge cover 32 is opened while the on-off changeover valve 42 is in the open state. This means that the gas cartridge 21 cannot be removed from the cartridge case 36 as long as the on-off changeover valve 42 is in the open state.

Figure 13A:
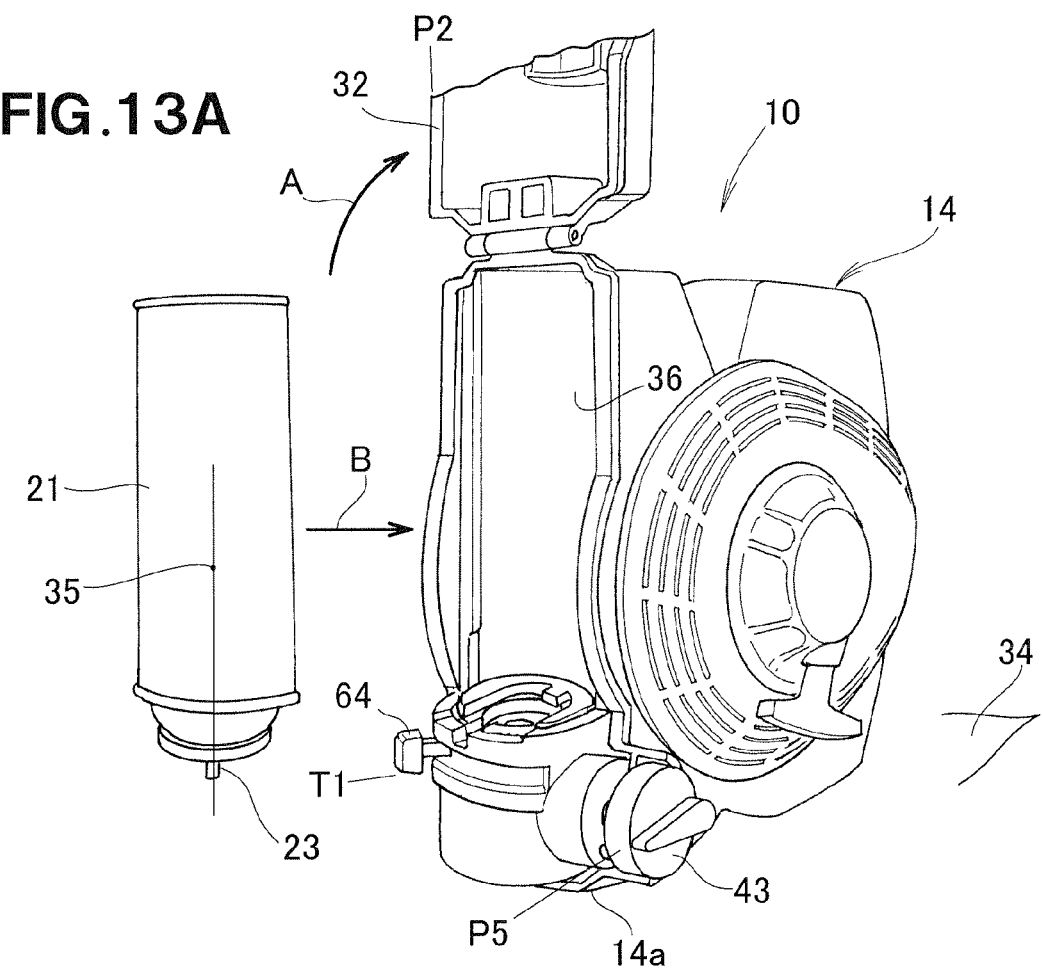
FIGS. 13A and 13B are perspective views illustrative of the manner in which a gas cartridge is placed in the cartridge holding unit.

Operation of the cartridge holding unit 20 performed when the gas cartridge 21 is loaded will be described below with reference to FIGS. 13A, 13B, 14, 15A and 15B. As shown in FIG. 13A, the brush cutter 10 is disposed in the normal rest position in which the brush cutter 10 is placed on a horizontal plane 34 with the bottom surface 14a of the machine body 14 lying flat on the horizontal surface 34. The selector knob 43 is disposed in the valve closing position P5, and the operation lever 64 is disposed in the home position T1.

The cartridge cover 32 is then pivotally moved from the closed position P1 (FIG. 10) to the open position P2 as indicated by the arrow A shown in FIG. 13A. While the cartridge cover 32 is disposed in the open position P2, the gas cartridge 21, while being kept in a vertical position with the discharge nozzle 23 directed vertically downward, is displaced in a direction (horizontal direction) perpendicular to the central axis 35 of the gas cartridge 21, as indicated by the arrow B shown in FIG. 13A.

Figure 13B:
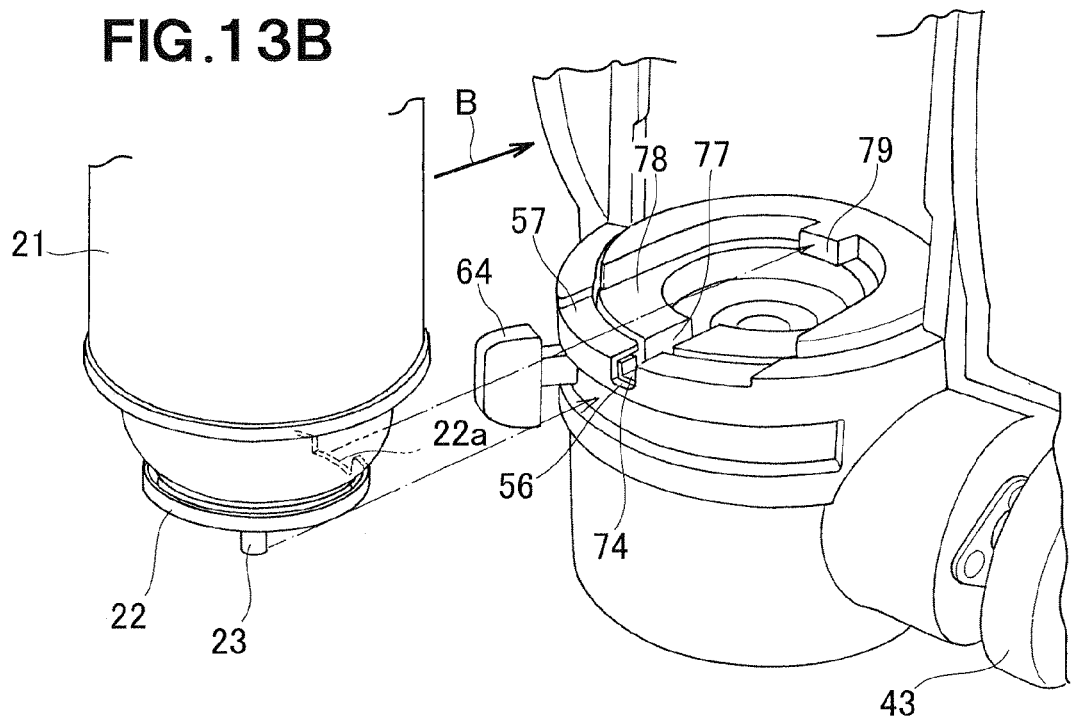

As the gas cartridge 21 moves in the direction of arrow B shown in FIG. 13B, the discharge nozzle 23 of the gas cartridge 21 is guided by and along the first guide groove 56 of the cup-shaped base 46 (FIG. 4), the guide groove 74 of the rotary member 61 (FIG. 4), and the first guide groove 77 of the lift member 62 (FIG. 4). The discharge nozzle 23 is finally placed in a predetermined standby position. At the same time, the connection flange 22 of the gas cartridge 21 is guided by and along the second guide groove 57 of the cup-shaped base 46 (FIG. 4) and the second guide groove 78 of the lift member 62 (FIG. 4). The connection flange 22 is also placed in the standby position. When the connection flange 22 is disposed in the standby position, the positioning notch 22a of the connection flange 22 is fitted with the positioning lug 79 of the lift member 62, so that the connection flange 22 (i.e., the gas cartridge 21) is set in a correctly oriented condition.

Figure 14:
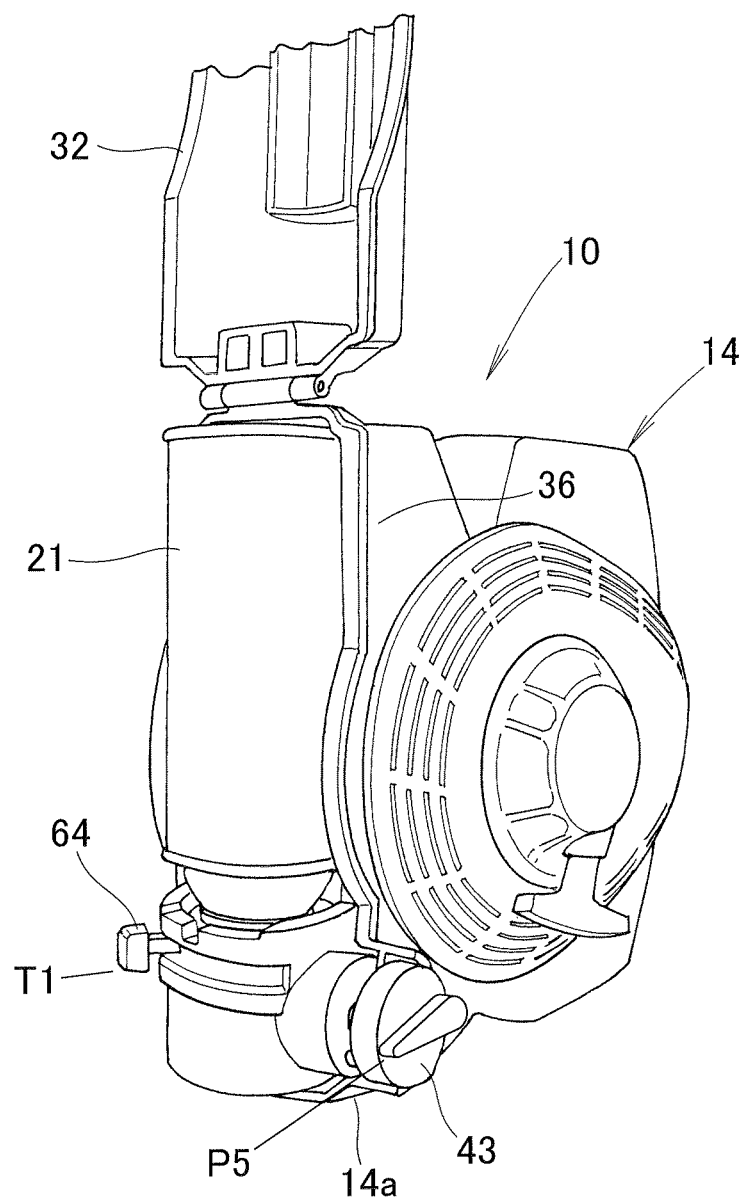
FIG. 14 is a perspective view of a machine body of the brush cutter having a gas cartridge held in the cartridge holding unit with the cartridge cover disposed in the open position.

The gas cartridge 21 is thus set in the cartridge case 34 while keeping the vertical position, as shown in FIG. 14. In this instance, the engine-near-side half 21a (FIG. 4) of the gas cartridge 21 is received in the cartridge case 36.

Figures 15A, 15B:
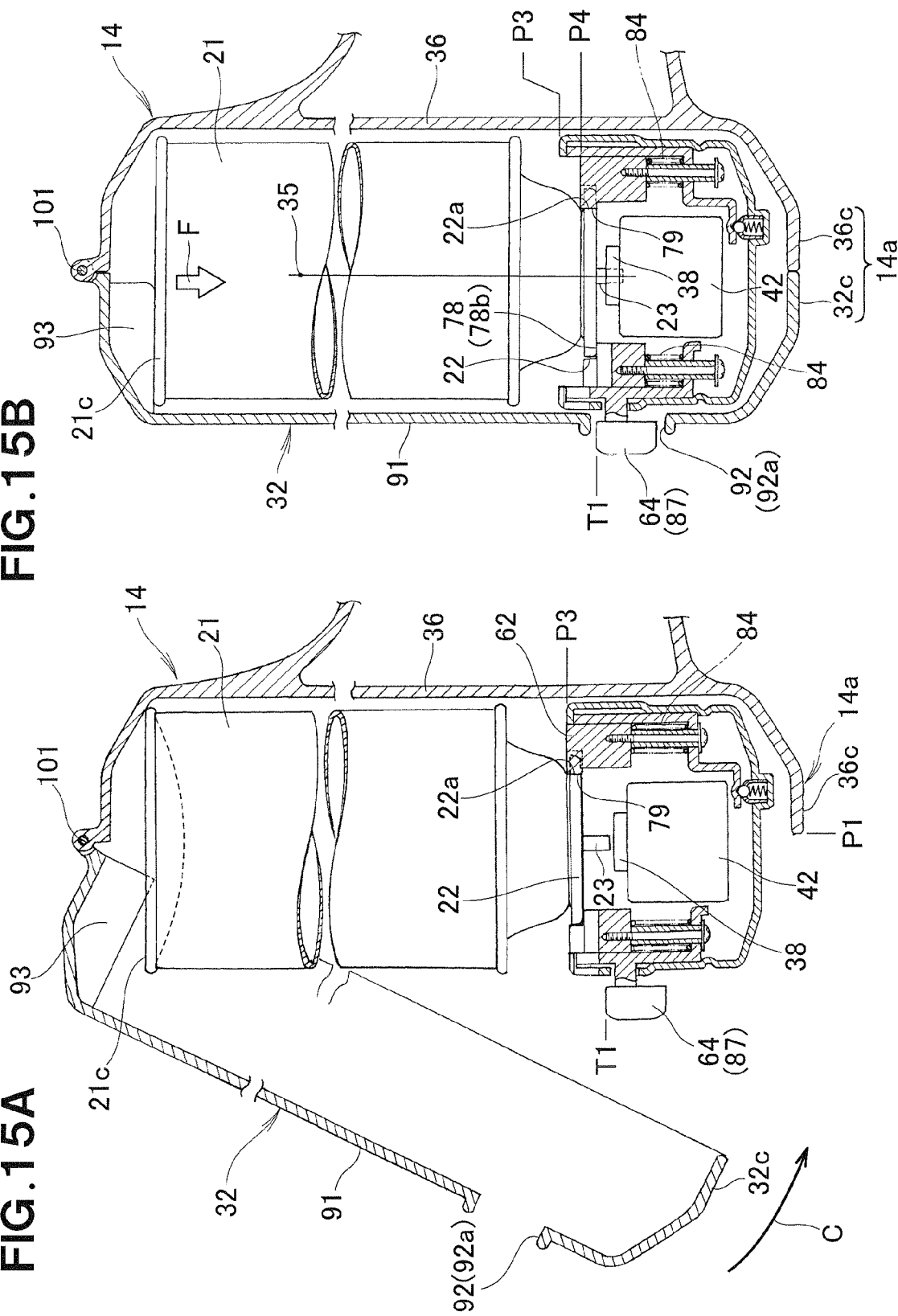
FIG. 15A is a cross-sectional view showing the cartridge cover as it moves from the open position to a closed position while the gas cartridge is held in a cartridge case of the cartridge holding unit.
FIG. 15B is a cross-sectional view showing the cartridge cover as it is in the closed position with the gas cartridge held in the cartridge holding unit.

As shown in FIG. 15A, when the gas cartridge 21 is disposed in the standby position while the connection flange 22 is correctly oriented by virtue of a fitting engagement between the positioning notch 22a of the connection flange 22 and the positioning lug 79 of the lift member 62, the connection flange 22 of the gas cartridge 21 is supported on the lift member 62 which is disposed in the standby position P3, and the discharge nozzle 23 of the gas cartridge 21 is vertically aligned with the nozzle retainer 38 and is disposed directly above the nozzle retainer 38.

The cartridge cover 32 held in the open position P2 (FIG. 13A) is then pivoted downward to move toward the closed position P1 as indicated by the arrow C shown in FIG. 15A. As the cartridge cover 32 pivotally moves from the open position P2 to the closed position P1, the presser portion 93 of the cartridge cover 32 first comes in contact with the bottom wall 21c of the gas cartridge 21, and then forces the bottom wall 21c of the gas cartridge 21 downward, as indicated by the arrow F shown in FIG. 15B. In this instance, since the connection flange 22 of the gas cartridge 21 is retained on the support portion 78 of the second guide groove 78 of the lift member 62, a downward force or pressure applied from the presser portion 93 of the cartridge cover 32 to the bottom wall 21c of the gas cartridge 21 will cause the gas cartridge 21 to move downward together with the lift member 62 against the force of the coiled compression spring members 84 until the lift member 62 reaches the loading position P4. During that time, the discharge nozzle 23 of the gas cartridge 21 is reliably retained in the nozzle retainer 38, as shown in FIG. 15B.

As shown in FIGS. 13A and 15B, when the brush cutter 10 is disposed in the normal rest position where the brush cutter 10 is placed on the horizontal plane 34 (FIG. 13A) with the bottom surface 14b of the machine body 14 lying flat on the horizontal plane 34, the gas cartridge 21 received in the cartridge case 36 is disposed in a substantially vertical position with the discharge nozzle 23 directed downward while the central axis 35 of the gas cartridge 21 is substantially perpendicular to the horizontal plane 34. The bottom surface 14a of the machine body 14 may be formed by a bottom surface 32c (FIGS. 15A and 15B) of the cartridge cover 32 and/or a bottom surface 36c (FIGS. 15A and 15B) of the cartridge case 36.

Figure 16:
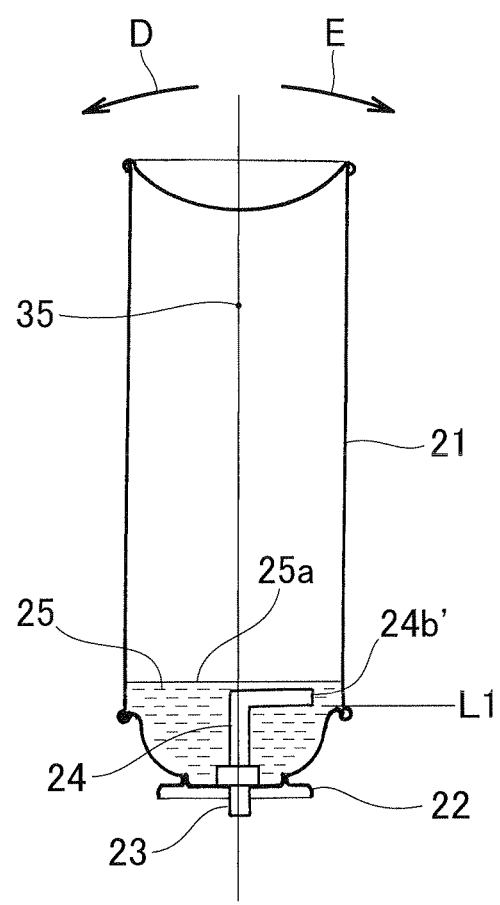
FIG. 16 is a diagrammatical view explanatory of the manner in which the gas cartridge is used in a vertical position with a discharge nozzle directed downward.

Various advantageous effects attained by the cartridge holding unit 20 according to the present invention will be described below with reference to FIG. 16, FIGS. 17A and 17B and FIGS. 18A and 18B. As shown in FIG. 16, in a loaded condition received inside the cartridge case 36 (FIG. 15B), the gas cartridge 21 is disposed in a vertical position with its discharge nozzle 23 directed downward while the central axis 35 of the gas cartridge 21 extends substantially parallel to a vertical line.

While the brush cutter 10 (FIG. 1) is in use, the vertically disposed gas cartridge 21 may be tilted forward or backward as indicated by the arrows D and E shown in FIG. 16 depending on the way of use of the brush cutter 10, such as shown in FIGS. 2A and 2B. In this instance, however, the discharge nozzle 23 of the gas cartridge 21 can maintain its downwardly directed position regardless of variations in the posture of the brush cutter 10. With this arrangement, the gas fuel 25 held in the gas cartridge 21 can be reliably introduced in the liquid phase from the fuel outlet 24b' into the fuel discharge pipe 24 until a liquid level 25a of the liquefied gas fuel 25 drops to a level L1. The thus introduced gas fuel 25 in the liquid phase is supplied from the discharge nozzle 23 of the gas cartridge 21 to the engine 15 (FIG. 1). It will be appreciated that even when the vertically disposed gas cartridge 21 is tilted forward or backward depending on the way of use of the brush cutter 10, the gas fuel 25 held in the gas cartridge 21 can be used in the liquid phase with the utmost efficiency.

Figure 17A:
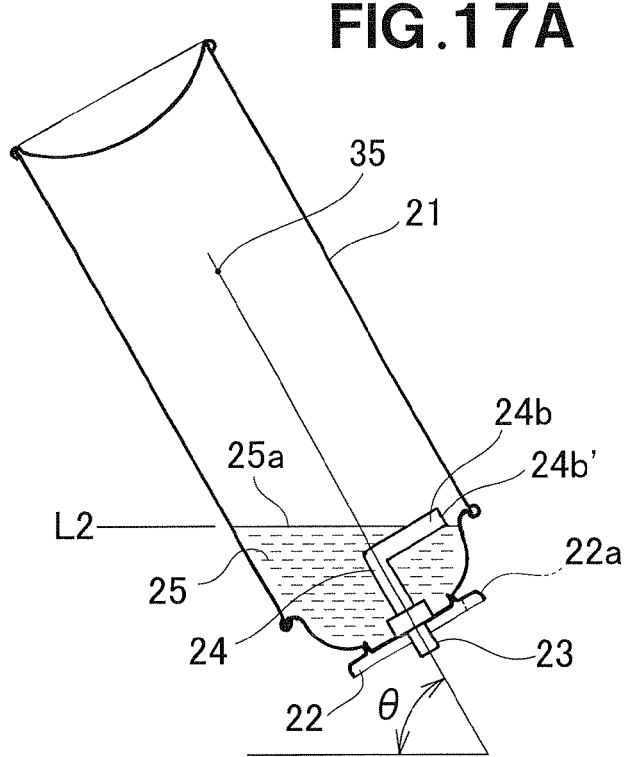
FIG. 17A is a diagrammatical view explanatory of the manner in which the gas cartridge held in the cartridge holding unit is tilted during use of the brush cutter.

According to the prevent invention, a further improvement in the efficiency of use of the gas fuel 25 can be achieved by the cartridge rotation mechanism 47 as will become apparent from a description given below with reference to FIGS. 17A and 17B and FIGS. 18A and 18B. As shown in FIG. 17A, the vertically disposed gas cartridge 21 is tilted forward at an angle of θ relative to the horizontal when the brush cutter 10 is used as an unwanted grass and plants cutter, such as shown in FIG. 2A. In the illustrated embodiment, the fuel discharge pipe 24 of the gas cartridge 21 is arranged such that the inner end part 24b including the fuel inlet 24b' is bent in the same direction as a direction of opening of the positioning notch 22a of the connection flange 22. When the gas cartridge 21 is disposed in the forwardly tilted position shown in FIG. 17A, the inner end part 24b including the fuel inlet 24b' of the fuel discharge pipe 24 is directed in an oblique upward direction. With the fuel discharge pipe 24 thus arranged, the gas fuel 25 held in the gas cartridge 21 can be used in the liquid phase until the liquid level 25a drops to a level L2 located just below the fuel inlet 24b'.

Figure 17B:
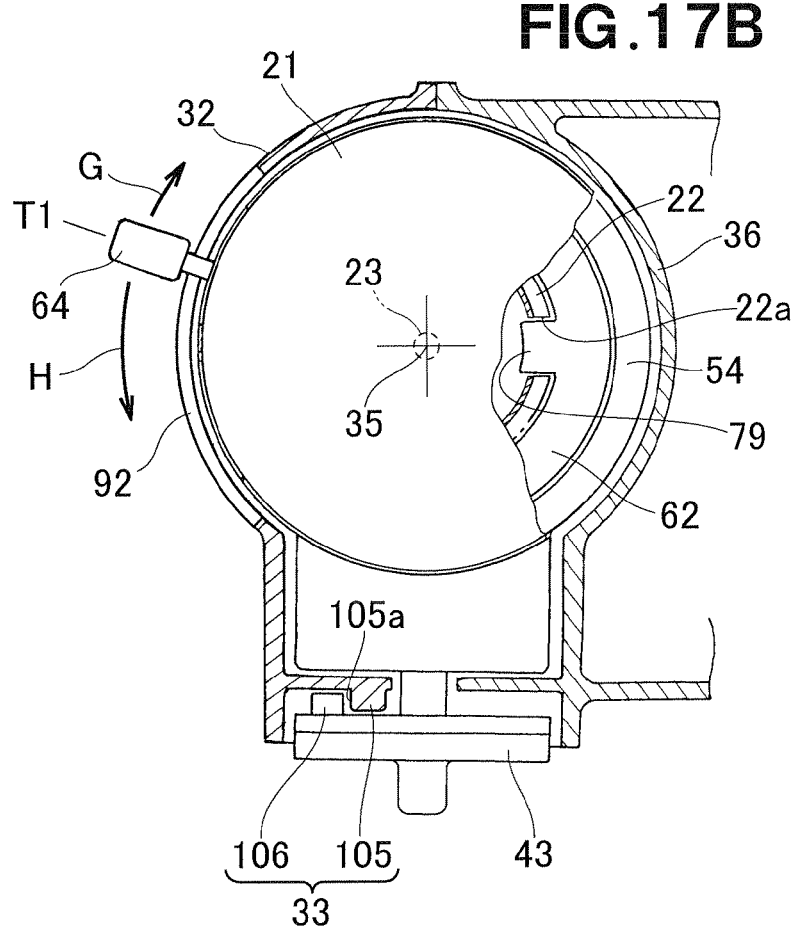
FIG. 17B is a cross-sectional view, with parts cut-away for clarity, of the cartridge holding unit shown with the gas cartridge held herein.

In order to enable further supply of the gas fuel 25 in the liquid phase from the discharge nozzle 23, the operation lever 64 which has been disposed in the home position T1 is angularly displaced in a direction indicated by the arrow G or H shown in FIG. 17B. By thus displacing the operation lever 64, the rotary member 61 (FIG. 4) and the lift member 62 are turned concurrently as a single unit in the direction of the arrow G or H. In this instance, because the positioning lug 79 of the lift member 62 is fitted with the positioning notch 22a of the connection flange 22 of the gas cartridge 21, the gas cartridge 21 is also turned about the central axis 35 in the same direction as the direction of turning of the lift member 62.

Figure 18A:
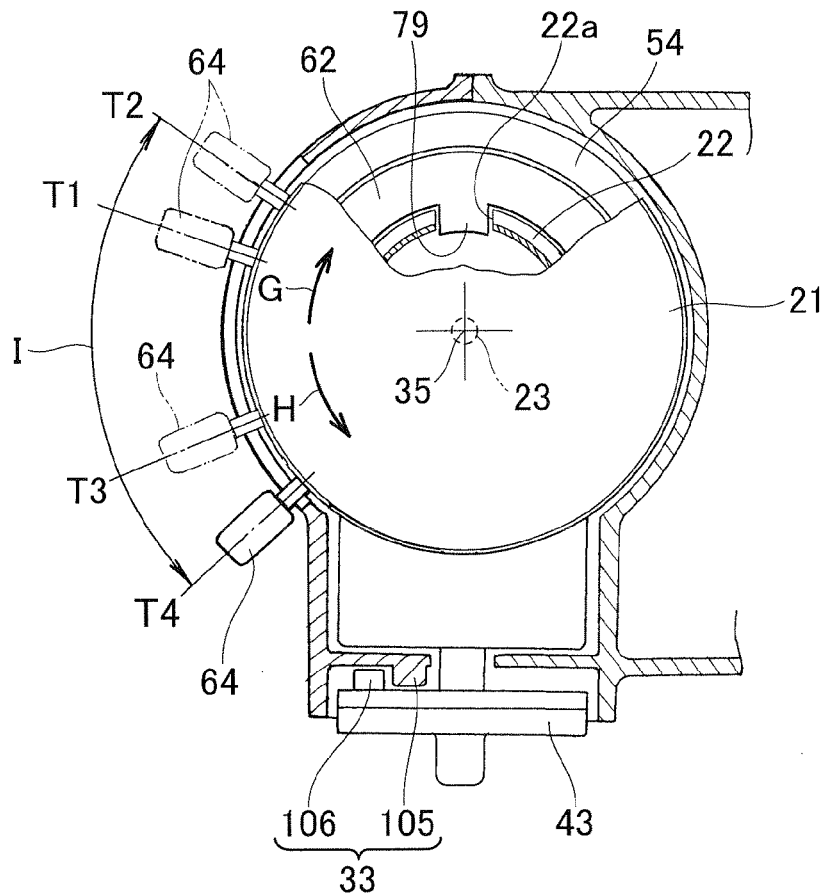
FIG. 18A is a view similar to FIG. 17B, but showing the manner in which the gas cartridge is turned about its central axis by a cartridge turning mechanism.

As shown in FIG. 18A, the operation lever 64 is angularly displaceable within a range I in which the home position T1, the first twist position T2, the second twist position T3 and the third twist position T4 are disposed. When the operation lever 64 is disposed in one position selected from among the four positions T1, T2, T3 and T4, the balls 97 of the detent mechanism 65 (FIG. 4) click into the positioning recesses 96. The balls 97 are then retained by the positioning recesses 96. With this clicking movement of the balls 97 relative to the positioning recesses 96, the human operator can readily understand that the operation lever 64 is reliably held in the selected position T1, T2, T3 or T4.

Figure 18B:
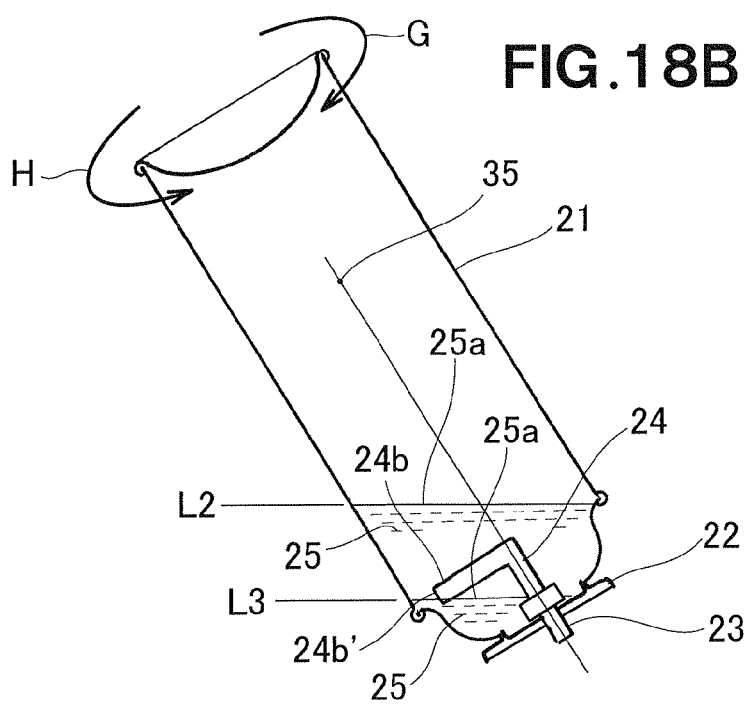
FIG. 18B is a diametrical view illustrative of the position of a fuel discharge pipe of the gas cartridge as assumed when the gas cartridge has turned about the central axis thereof through a predetermined angular range.

As shown in FIG. 18B, by turning the gas cartridge 21 about the central axis 35 in the direction of the arrow H or G, it is possible to arrange the fuel discharge pipe 24 in a position where the fuel inlet 26b' faces in an oblique downward direction. With this arrangement, the fuel inlet 24b' of the fuel discharge pipe 24 is now disposed at a lower position than the level L2 of the liquid level 25a of the gas fuel 25 and, hence, is kept immersed in the gas fuel 25 held in the gas cartridge 21. As a consequence, the gas fuel 25 in the gas cartridge 21 can be reliably introduced in the liquid phase from the fuel inlet 24b' into the fuel discharge pipe 24 until the liquid level 25a of the gas fuel 25 further drops to a level L3 which is located just below the fuel inlet 24b'. The thus introduced gas fuel 25 in the liquid phase is supplied from the discharge nozzle 23 of the gas cartridge 21 to the engine 15 (FIG. 1).

By thus turning the gas cartridge 21 about its central axis 35, it is possible to use the gas fuel 25 in the gas cartridge 21 with increased efficiencies particularly when the gas cartridge 21 is tilted forward or backward depending on the way of use of the brush cutter 10.

In the embodiment described above with reference to the accompanying sheets of drawings, the gas-engine-powered handheld working machine 10 takes the form of a brush cutter. The present invention should by no means be limited to the illustrated embodiment but can be applied to any other handheld working machine such as an air-blower, a chainsaw or the like that can be driven by a gas engine. Although in the illustrated embodiment, the operation lever 64 is temporarily arrested in one position selected from among four positions (i.e., the home position T1, the first twist position T2, the second twist position T3, and the third twist position T4), the number of arresting positions of the operation lever 64 is optional. The configuration of the detent mechanism 65 should by no means be limited to the one shown in the illustrated embodiment but may be modified as the need arises.

The present invention is particularly suitable when embodied in a handheld working machine having a working unit driven by a gas engine capable of running on a gas fuel supplied from a gas cartridge.

Obviously, various minor changes and modifications of the present invention are possible in light of the above teaching.

It is therefore to be understood that within the scope of the appended claims the invention may be practiced otherwise than as specifically described.

What is claimed is:

1. A gas-engine-powered handheld working machine, comprising:
   a cylindrical gas cartridge holding therein a liquefied gas fuel and having a discharge nozzle for supplying therefrom the gas fuel, the gas cartridge having a central axis passing through the discharge nozzle;
   a machine body including an engine capable of running on the gas fuel supplied from the discharge nozzle of the gas cartridge, the machine body having a bottom surface;
   a cartridge cover for covering the gas cartridge;
   a cartridge holding unit including a cartridge rotation mechanism, wherein the cartridge rotation mechanism includes an operation lever manually operable to rotate the gas cartridge about a central axis thereof, the operation lever projecting outwardly from the cartridge cover;
   and a working unit driven by the engine, wherein when the handheld working machine is disposed in a normal rest position in which the handheld working machine is placed on a horizontal plane with the bottom surface of the machine body lying flat on the horizontal plane, the gas cartridge is disposed in a substantially vertical position with the discharge nozzle directed downwards while the central axis of the gas cartridge extends substantially perpendicular to the horizontal plane, so that the discharge nozzle of the gas cartridge maintains a downwardly directed orientation even when the gas cartridge is tilted forward or backward depending on use of the gas-engine-powered handheld working machine.

2. The gas-engine-powered handheld working machine according to claim 1, wherein the engine includes an engine case, the cartridge holding unit being formed integrally with the engine case.

3. The gas-engine-powered handheld working machine according to claim 2, wherein the cartridge rotation mechanism rotates the gas cartridge about the central axis thereof while the gas cartridge is held in the cartridge holding unit.

4. The gas-engine-powered handheld working machine according to claim 3, wherein the cartridge holding unit includes a cartridge case formed integrally with the engine case for receiving therein the gas cartridge, and the cartridge cover for covering the gas cartridge while the gas cartridge is received in the cartridge case, the cartridge cover being pivotally connected to the cartridge case and movable to undergo pivotal movement between an open position in which the cartridge case is opened, and a closed position in which the cartridge case is closed, wherein the operation lever projects outwardly from the cartridge cover when the cartridge cover is disposed in the closed position, and wherein the cartridge cover is configured such that the cartridge cover can be opened and closed when the operation lever is disposed in a predetermined position where an amount of gas fuel left unused in the liquid phase within the gas cartridge can be minimized.

5. The gas-engine-powered handheld working machine according to claim 4, wherein the cartridge holding unit includes a gas fuel flow passage through which the gas fuel from the discharge nozzle of the gas cartridge is supplied to the engine, an on-off changeover valve disposed across the gas fuel flow passage for opening and closing the gas fuel flow passage, and a selector knob manually operable to switch the on-off state of the on-off changeover valve, wherein the selector knob is configured to allow the cartridge cover to be opened when the selector knob is disposed in a valve closing position in which the on-off changeover valve is switched to the off state.

6. The gas-engine-powered handheld working machine according to claim 4, wherein the gas cartridge is receivable in the cartridge case by being displaced in a horizontal direction while keeping the vertical position, wherein the cartridge holding unit includes: a nozzle retainer for retaining therein the discharge nozzle of the gas cartridge; a first guide groove and a second guide groove that extend along the horizontal direction for guiding the discharge nozzle into a standby position while guiding the discharge nozzle and a connection flange, respectively, of the gas cartridge when the gas cartridge is displaced in the horizontal direction, wherein when the gas cartridge is disposed in the standby position, the discharge nozzle of the gas cartridge is aligned with and disposed directly above the nozzle retainer; and presser means on the cartridge cover for forcing the gas cartridge in a downward direction to move the gas cartridge from the standby position to a loading position where the discharge nozzle of the gas cartridge is retained in the nozzle retainer.

* * * * *